US012565764B2

(12) United States Patent
Snitil

(10) Patent No.: US 12,565,764 B2
(45) Date of Patent: Mar. 3, 2026

(54) RETROFIT ELECTRONIC PLUMBING SYSTEM

(71) Applicant: Fortune Brands Water Innovations LLC, North Olmsted, OH (US)

(72) Inventor: Ryan M. Snitil, Medina, OH (US)

(73) Assignee: Fortune Brands Water Innovations, Deerfield, IL (US)

( * ) Notice: Subject to any disclaimer, the term of this patent is extended or adjusted under 35 U.S.C. 154(b) by 0 days.

(21) Appl. No.: 18/680,589

(22) Filed: May 31, 2024

(65) Prior Publication Data

US 2024/0401712 A1    Dec. 5, 2024

Related U.S. Application Data

(60) Provisional application No. 63/505,244, filed on May 31, 2023, provisional application No. 63/505,235, filed on May 31, 2023.

(51) Int. Cl.
*E03C 1/042* (2006.01)
*E03C 1/04* (2006.01)
*G05D 11/13* (2006.01)

(52) U.S. Cl.
CPC ...... *E03C 1/042* (2013.01); *E03C 2001/0418* (2013.01); *G05D 11/135* (2013.01)

(58) Field of Classification Search
CPC ......... G05D 11/135; E03C 1/01; E03C 1/042; E03C 2001/0418; E03C 1/055; F16K 11/0712; F16K 19/006
See application file for complete search history.

(56) References Cited

U.S. PATENT DOCUMENTS 3,960,016 A * 6/1976 Symmons ................ G01K 1/14
236/94
4,241,868 A 12/1980 Perkins
(Continued)

FOREIGN PATENT DOCUMENTS

AU        2010257265 A1    7/2012
BR    112012029635-3 A2    8/2016
(Continued)

OTHER PUBLICATIONS

International Search Report for International App. No. PCT/US2024/032003 dated Nov. 20, 2024 (4 pages).
(Continued)

*Primary Examiner* — Reinaldo Sanchez-Medina
(74) *Attorney, Agent, or Firm* — Calfee, Halter & Griswold LLP

(57) ABSTRACT

A plumbing system operable to retrofit a mechanical system into an electronic system is provided. The plumbing system includes a showerhead, a valve body, a tub spout, and a retrofit assembly. The retrofit assembly includes an adapter, a mixing assembly, a power module, a digital assembly, a housing, and a mounting assembly. The valve body and the adapter are operable to be located behind a mounting surface. The mixing assembly, the digital assembly, and the housing are operable to be located in front of a mounting surface. The mounting assembly is operable to mount the mixing assembly, the power module, the digital assembly, and the housing in front of the mounting surface to the valve body and the adapter behind the mounting surface.

20 Claims, 33 Drawing Sheets

(56) References Cited

U.S. PATENT DOCUMENTS

| | | | |
|---|---|---|---|
| 4,584,723 A * | 4/1986 | Hussauf | F16K 27/045 |
| | | | 4/696 |
| 4,828,709 A | 5/1989 | Houser et al. | |
| 4,854,498 A | 8/1989 | Stayton | |
| 4,944,049 A | 7/1990 | Leonard | |
| 4,974,636 A | 12/1990 | Cogger | |
| 5,459,890 A | 10/1995 | Jarocki | |
| 5,829,469 A | 11/1998 | Sileno, Jr. et al. | |
| 5,944,255 A | 8/1999 | Shirmohamadi | |
| 6,449,370 B1 | 9/2002 | Yasuno et al. | |
| 6,467,103 B1 | 10/2002 | Gardenier et al. | |
| 6,676,024 B1 | 1/2004 | McNerney et al. | |
| 6,734,685 B2 | 5/2004 | Rudrich | |
| 6,820,856 B2 | 11/2004 | Grill | |
| 6,823,536 B2 | 11/2004 | Yip | |
| 6,826,455 B1 | 11/2004 | Iott et al. | |
| 6,868,564 B2 | 3/2005 | Ginter et al. | |
| 6,913,203 B2 | 7/2005 | DeLangis | |
| 6,925,661 B1 | 8/2005 | Anger | |
| 7,124,452 B1 | 10/2006 | Bauza | |
| 7,198,059 B2 | 4/2007 | Kempf et al. | |
| 7,338,594 B2 | 3/2008 | Lackey et al. | |
| 7,360,413 B2 | 4/2008 | Jeffries et al. | |
| 7,468,127 B2 | 12/2008 | Hsu | |
| 7,669,613 B2 * | 3/2010 | Egli | E03C 1/042 |
| | | | 137/580 |
| 7,761,937 B2 | 7/2010 | Foutz et al. | |
| 8,646,121 B2 | 2/2014 | Nguyen | |
| 8,844,564 B2 | 9/2014 | Jonte et al. | |
| 9,238,237 B2 | 1/2016 | Peel et al. | |
| 9,243,392 B2 | 1/2016 | Marty et al. | |
| 9,250,105 B2 | 2/2016 | Patel et al. | |
| 9,416,764 B1 | 8/2016 | Dubbaka | |
| 9,470,336 B2 | 10/2016 | Huffington et al. | |
| 9,632,514 B2 | 4/2017 | Marty et al. | |
| 9,749,792 B2 | 8/2017 | Klicpera | |
| 10,550,555 B2 | 2/2020 | Chen | |
| 10,816,106 B2 | 10/2020 | Fisher et al. | |
| 10,941,547 B2 | 3/2021 | Chakraborty et al. | |
| 11,116,986 B2 | 9/2021 | Kaula et al. | |
| 11,156,302 B2 * | 10/2021 | Jones | E03C 1/02 |
| 11,221,270 B2 | 1/2022 | Evans | |
| 2002/0144341 A1 | 10/2002 | Zieger | |
| 2002/0148040 A1 | 10/2002 | Mateina | |
| 2002/0179723 A1 | 12/2002 | Wack et al. | |
| 2005/0082396 A1 | 4/2005 | Wawrla | |
| 2005/0279676 A1 | 12/2005 | Izzy et al. | |
| 2006/0151523 A1 | 7/2006 | Fetzer | |
| 2006/0201558 A1 | 9/2006 | Marty et al. | |
| 2007/0069169 A1 | 3/2007 | Lin | |
| 2008/0112843 A1 | 5/2008 | Peel et al. | |
| 2008/0245422 A1 | 10/2008 | McTargett | |
| 2008/0313799 A1 | 12/2008 | Nguyen | |
| 2009/0293192 A1 | 12/2009 | Pons | |

| | | | |
|---|---|---|---|
| 2010/0012165 A1 | 1/2010 | Bedard | |
| 2011/0114187 A1 | 5/2011 | Sawaski | |
| 2012/0216893 A1 | 8/2012 | Shapira | |
| 2013/0075483 A1 | 3/2013 | Marty et al. | |
| 2013/0333764 A1 | 12/2013 | Wright | |
| 2013/0340846 A1 | 12/2013 | Peel et al. | |
| 2014/0020173 A1 * | 1/2014 | Sargiani | E03C 1/01 |
| | | | 4/670 |
| 2014/0102555 A1 | 4/2014 | Allen et al. | |
| 2014/0201903 A1 | 7/2014 | Bronstein | |
| 2014/0261780 A1 | 9/2014 | Thomas et al. | |
| 2015/0153744 A1 | 6/2015 | Didion et al. | |
| 2015/0191900 A1 | 7/2015 | Johnson et al. | |
| 2015/0345119 A1 | 12/2015 | Mills | |
| 2017/0128960 A1 | 5/2017 | D'Urso et al. | |
| 2017/0326026 A1 | 11/2017 | Kasbohm | |
| 2017/0344031 A1 | 11/2017 | Tuineag et al. | |
| 2017/0350101 A1 | 12/2017 | Lee et al. | |
| 2018/0085763 A1 | 3/2018 | Leckner | |
| 2018/0094413 A1 | 4/2018 | Chaky | |
| 2019/0001006 A1 | 1/2019 | Rodenbeck et al. | |
| 2019/0106867 A1 | 4/2019 | Mariano | |
| 2020/0089262 A1 | 3/2020 | Wales et al. | |
| 2020/0218294 A1 | 7/2020 | Jeromson et al. | |
| 2020/0284008 A1 | 9/2020 | Bueno Palacios et al. | |
| 2021/0030215 A1 | 2/2021 | Knoll Jun. | |
| 2021/0176319 A1 | 6/2021 | Leannah et al. | |
| 2021/0214926 A1 | 7/2021 | Backus | |
| 2021/0357454 A1 | 11/2021 | Rexach et al. | |
| 2021/0388584 A1 | 12/2021 | Thomas et al. | |
| 2022/0010535 A1 | 1/2022 | Haneckow et al. | |
| 2022/0064929 A1 | 3/2022 | Garrels et al. | |
| 2022/0074177 A1 | 3/2022 | DeVries | |
| 2022/0121228 A1 | 4/2022 | Hobbs et al. | |
| 2022/0121232 A1 | 4/2022 | Hobbs et al. | |
| 2022/0129019 A1 | 4/2022 | Fang et al. | |

FOREIGN PATENT DOCUMENTS

| | | | |
|---|---|---|---|
| CA | 2 904 925 C | 2/2020 | |
| CN | 103511725 B | 10/2017 | |
| CN | 110168177 B | 5/2021 | |
| CN | 112840086 A | 5/2021 | |
| DE | 197 28 624 C2 | 8/2001 | |
| DE | 10 2010 030 659 A1 | 12/2011 | |
| DE | 10 2015 000 015 A1 | 7/2016 | |
| EP | 1 369 536 A1 | 12/2003 | |
| EP | 3 486 380 A1 | 5/2019 | |
| WO | 2012-142578 A2 | 10/2012 | |

OTHER PUBLICATIONS

Written Opinion of the International Search Authority for International App. No. PCT/US2024/032003 dated Nov. 20, 2024 (7 pages).

* cited by examiner

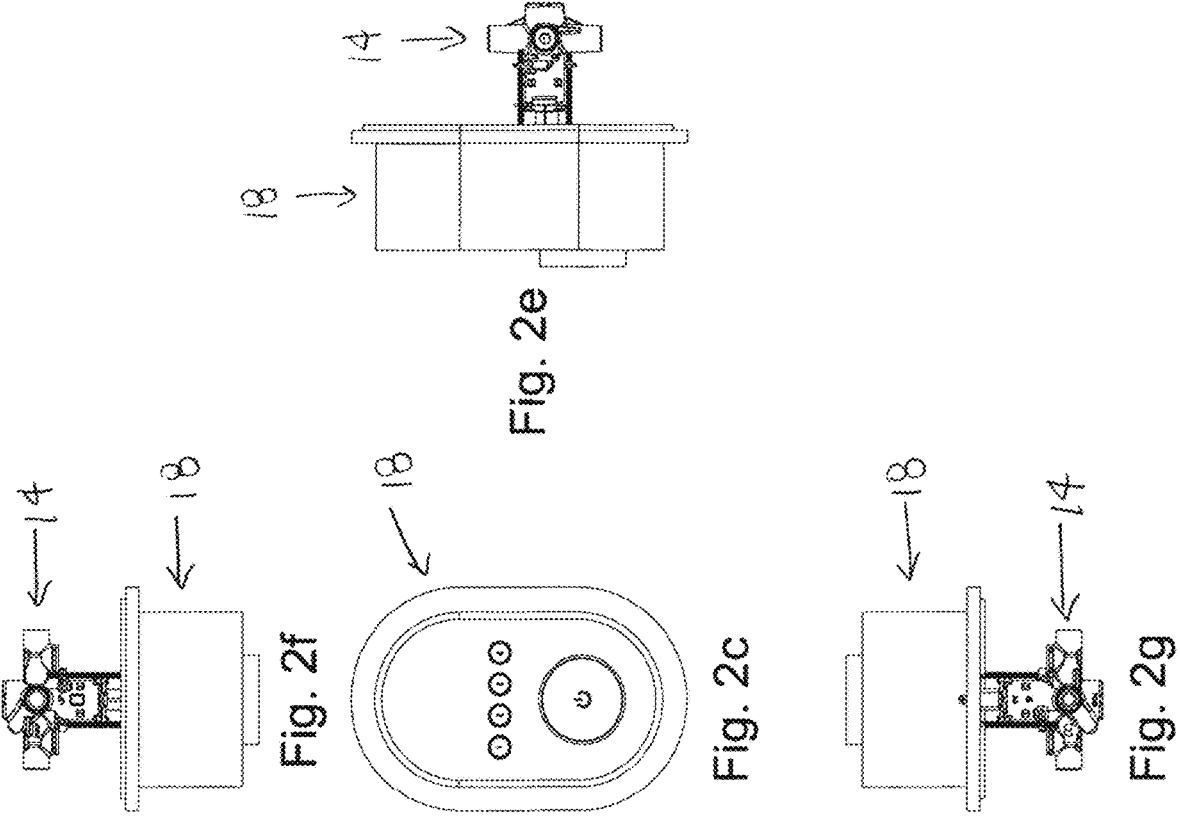
Fig. 2e
Fig. 2f
Fig. 2c
Fig. 2g
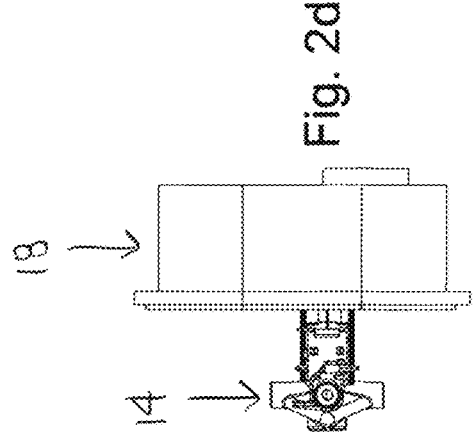
Fig. 2d

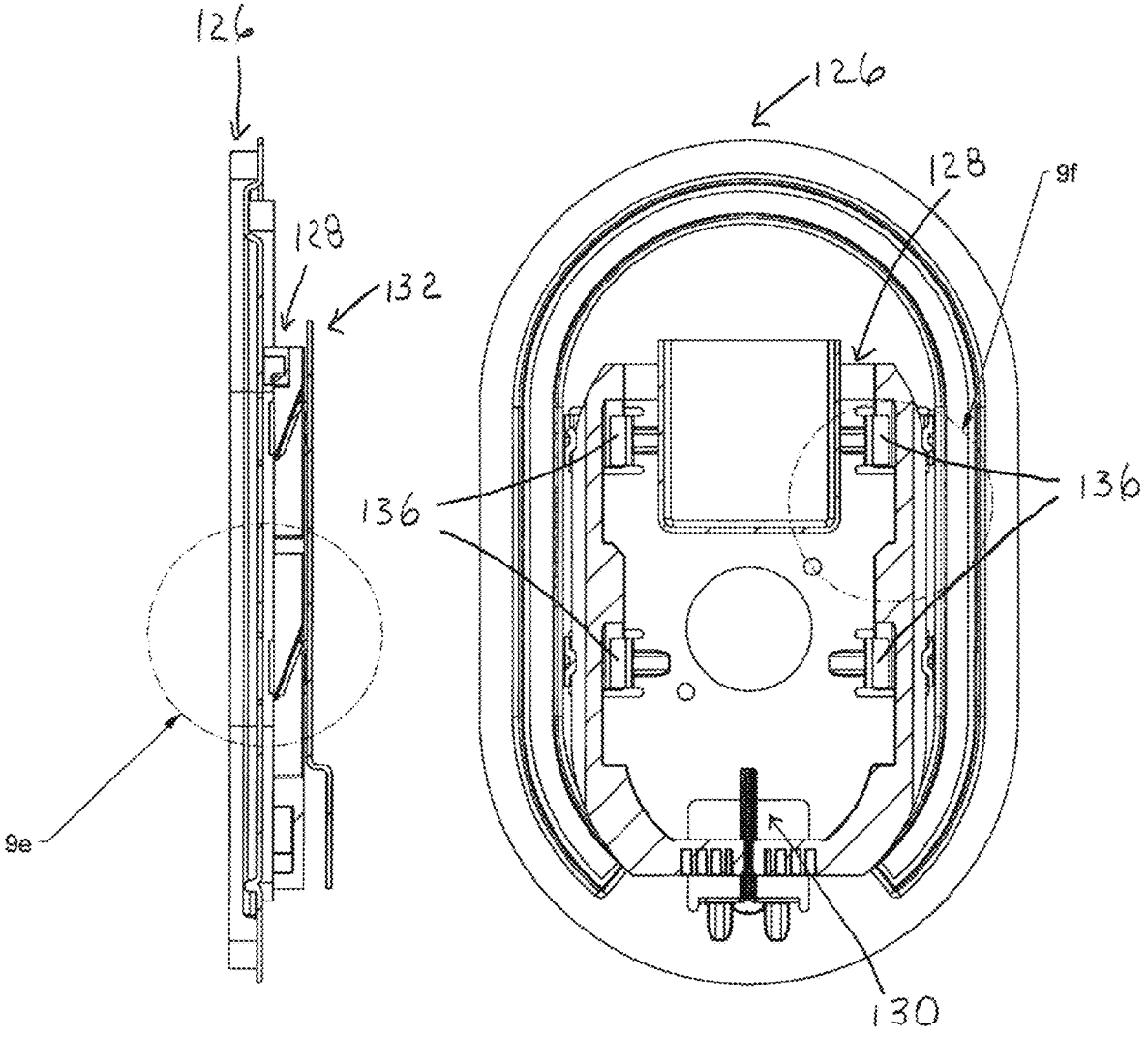
Fig. 9c                    Fig. 9d

RETROFIT ELECTRONIC PLUMBING SYSTEM

CROSS-REFERENCE TO RELATED APPLICATIONS

This application claims the benefit of U.S. Provisional Application Nos. 63/505,235 and 63/505,244, both filed May 31, 2023, the entire disclosures of which are hereby incorporated by reference.

FIELD

The present invention relates generally to a plumbing system operable to retrofit a mechanical system into an electronic system and, more specifically, to a plumbing system with a mounting assembly operable to mount an electronic mixing assembly in front of a mounting surface.

BACKGROUND

Both mechanical and electronic plumbing systems are known. Mechanical systems can be difficult to retrofit into electronic systems. Plumbing systems that are easier to retrofit from a mechanical system to an electronic system are desired.

SUMMARY

The present invention provides a plumbing system operable to retrofit a mechanical system into an electronic system.

In an exemplary embodiment, the plumbing system having a valve body, the plumbing system comprises an adapter, a mixing assembly, and a housing. The adapter is operable to be received in the valve body behind a mounting surface. The adapter is further operable to receive hot water from a hot water inlet of the valve body and cold water from a cold water inlet of the valve body. The mixing assembly is operable to fluidly communicate with the adapter. The mixing assembly is further operable to receive hot water and cold water from the adapter and provide mixed water to the adapter. The mixing assembly is operable to be received in the housing in front of the mounting surface. The mixing assembly includes a waterway and an electronic valve. The waterway is operable to receive hot water and cold water from the adapter and provide mixed water to the adapter. The electronic valve is operable to control flow of hot water and cold water from the adapter to the waterway.

In an exemplary embodiment, the plumbing system having a valve body, the plumbing system comprises an adapter, a mixing assembly, and a housing. The adapter is operable to be received in the valve body behind a mounting surface. The adapter is further operable to receive hot water from a hot water inlet of the valve body and cold water from a cold water inlet of the valve body. The mixing assembly is operable to fluidly communicate with the adapter. The mixing assembly is further operable to receive hot water and cold water from the adapter and provide mixed water to the adapter. The mixing assembly is operable to be received in the housing in front of the mounting surface. The mixing assembly includes a waterway, an electronic valve, and a temperature sensor. The waterway is operable to receive hot water and cold water from the adapter and provide mixed water to the adapter. The electronic valve is operable to control flow of hot water and cold water from the adapter to the waterway. The temperature sensor is operable to detect a temperature of mixed water flowing through the waterway. The electronic valve is operable to control flow of hot water and cold water from the adapter to the waterway based on the detected temperature of mixed water flowing through the waterway.

In an exemplary embodiment, the plumbing system having a valve body, the plumbing system comprises an adapter, a mixing assembly, and a housing. The adapter is operable to be received in the valve body behind a mounting surface. The adapter is further operable to receive hot water from a hot water inlet of the valve body and cold water from a cold water inlet of the valve body. The mixing assembly is operable to fluidly communicate with the adapter. The mixing assembly is further operable to receive hot water and cold water from the adapter and provide mixed water to the adapter. The mixing assembly is operable to be received in the housing in front of the mounting surface. The mixing assembly includes a waterway and an electronic valve. The waterway is operable to receive hot water and cold water from the adapter and provide mixed water to the adapter. The electronic valve is operable to control flow of hot water and cold water from the adapter to the waterway. The electronic valve includes a single motor.

BRIEF DESCRIPTION OF THE DRAWINGS

FIGS. 2a-2g are assembled views of a valve body and a retrofit assembly of the plumbing system of FIG. 1-FIG. 2a is a front left perspective view, FIG. 2b is a rear right perspective view, FIG. 2c is a front view, FIG. 2d is a left side view, FIG. 2e is a right side view, FIG. 2f is a top view, and FIG. 2g is a bottom view;

-FIG. 6a is a front left perspective view, FIG. 6b is a rear right perspective view, FIG. 6c is a front view, FIG. 6d is a right side view, FIG. 6e is a bottom view, FIG. 6f is a cross-sectional view taken along the line 6f-6f in FIG. 6c, FIG. 6g is a cross-sectional view taken along the line 6g-6g in FIG. 6d, and FIG. 6h is an exploded front left perspective view;

-FIG. 8a is a top view, FIG. 8b is a right side view, FIG. 8c is a cross-sectional view taken along the line 8c-8c in FIG. 8a; FIG. 8d is a cross-sectional view taken along the line 8d-8d in FIG. 8b, FIG. 8e is a detail view of the section 8e in FIG. 8c, and FIG. 8f is a detail view of the section 8f in FIG. 8d;

FIGS. 9a-9f are assembled views of the components of the mounting assembly of FIG. 7 in an engaged state-FIG. 9a is a top view, FIG. 9b is a right side view, FIG. 9c is a cross-sectional view taken along the line 9c-9c in FIG. 9a; FIG. 9d is a cross-sectional view taken along the line 9d-9d in FIG. 9b, FIG. 9e is a detail view of the section 9e in FIG. 9c, and FIG. 9f is a detail view of the section 9f in FIG. 9d;

-FIG. 10a is a front view, FIG. 10b is a cross-sectional view taken along the line 10b-10b in FIG. 10a; and FIG. 10c is a cross-sectional view taken along the line 10c-10c in FIG. 10a;

—FIG. 11a is a front view, FIG. 11b is a cross-sectional view taken along the line 11b-11b in FIG. 11a; and FIG. 11c is a cross-sectional view taken along the line 11c-11c in FIG. 11a;

-FIG. 12a is a front view, FIG. 12b is a cross-sectional view taken along the line 12b-12b in FIG. 12a; and FIG. 12c is a cross-sectional view taken along the line 12c-12c in FIG. 12a;

-FIG. 13a is a front view, FIG. 13b is a cross-sectional view taken along the line 13b-13b in FIG. 13a, and FIG. 13c is a cross-sectional view taken along the line 13c-13c in FIG. 13a;

-FIG. 14a is a rear right perspective view, FIG. 14b is a bottom view, FIG. 4c is a left side view, FIG. 14d is a cross-sectional view taken along the line 14d-14d in FIG. 14b, FIG. 14e is a cross-sectional view taken along the line 14e-14e in FIG. 14c, and FIG. 14f is a cross-sectional view taken along the line 14f-14f in FIG. 14c;

DETAILED DESCRIPTION

Figure 1:
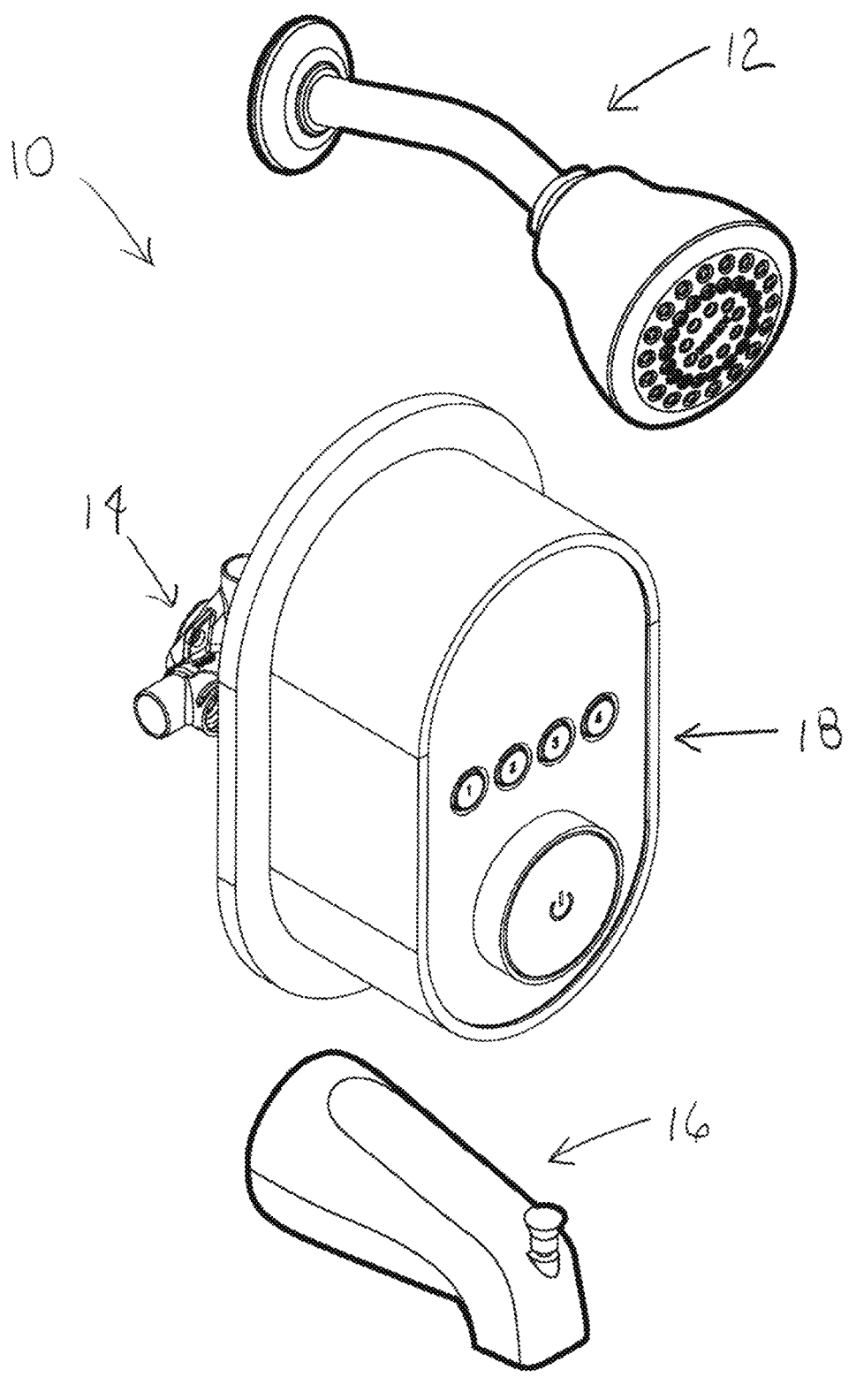
FIG. 1 is a perspective view of a plumbing system according to an exemplary embodiment of the present invention.
Figure 2A:
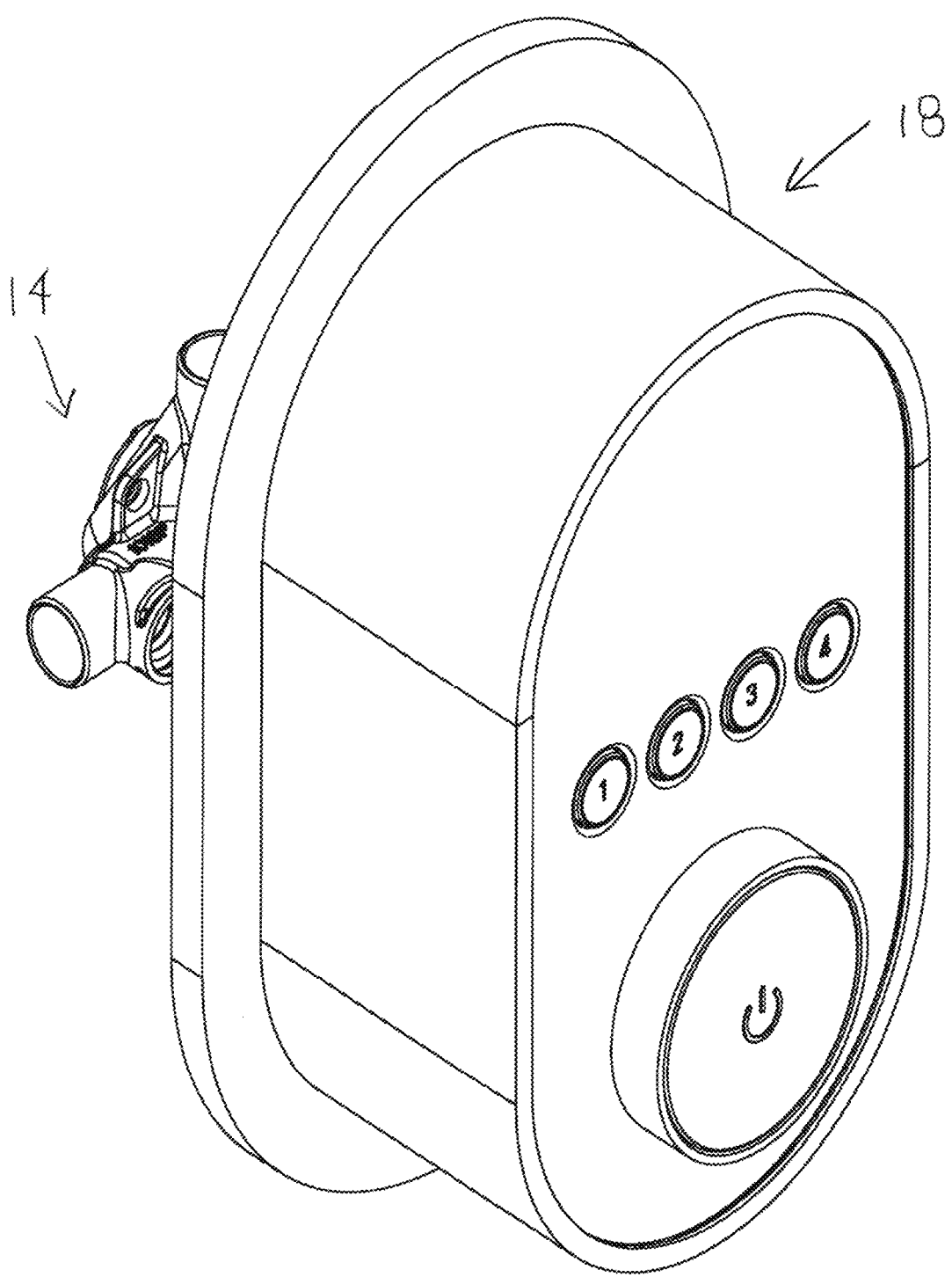
Figure 2B:
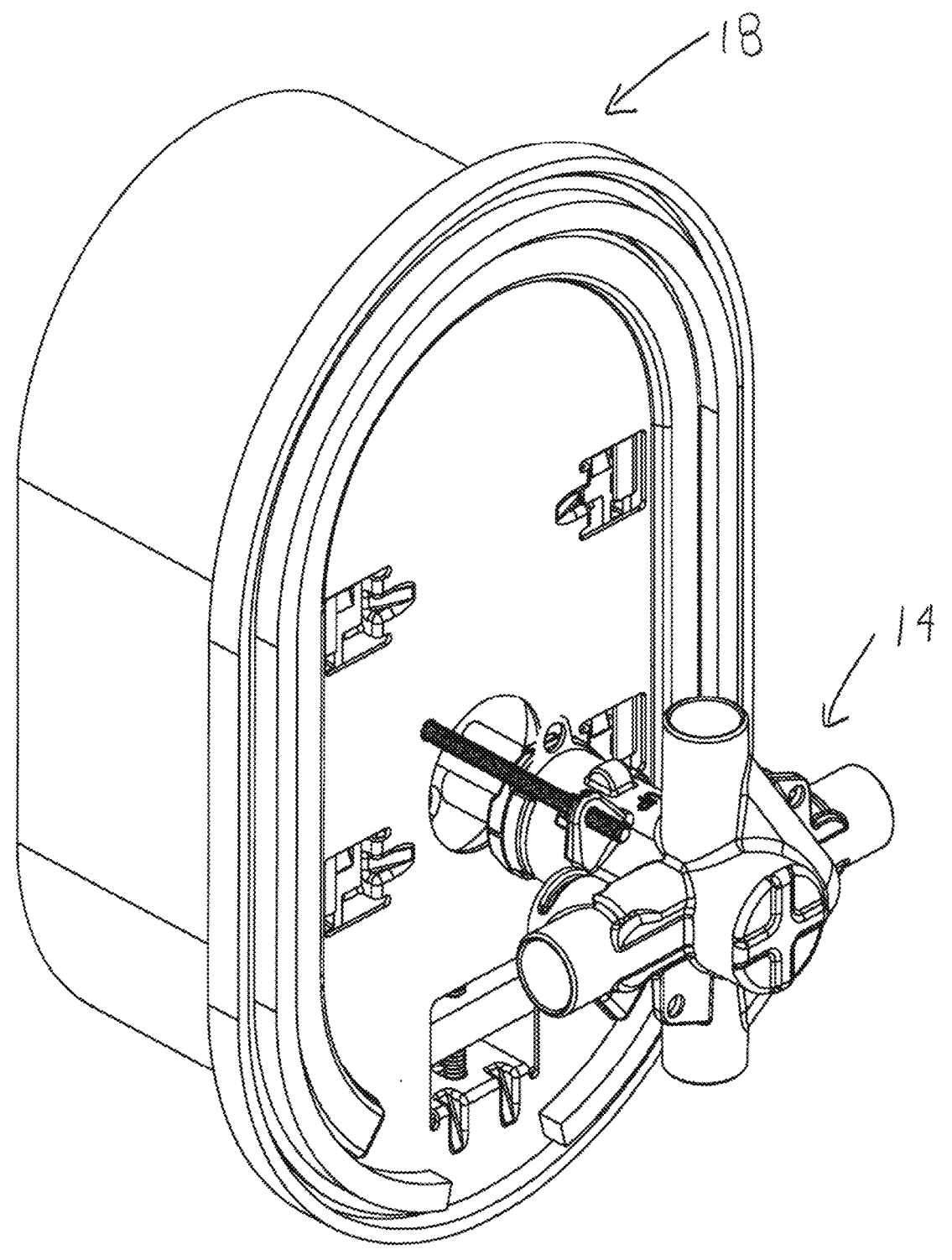
Figure 3:
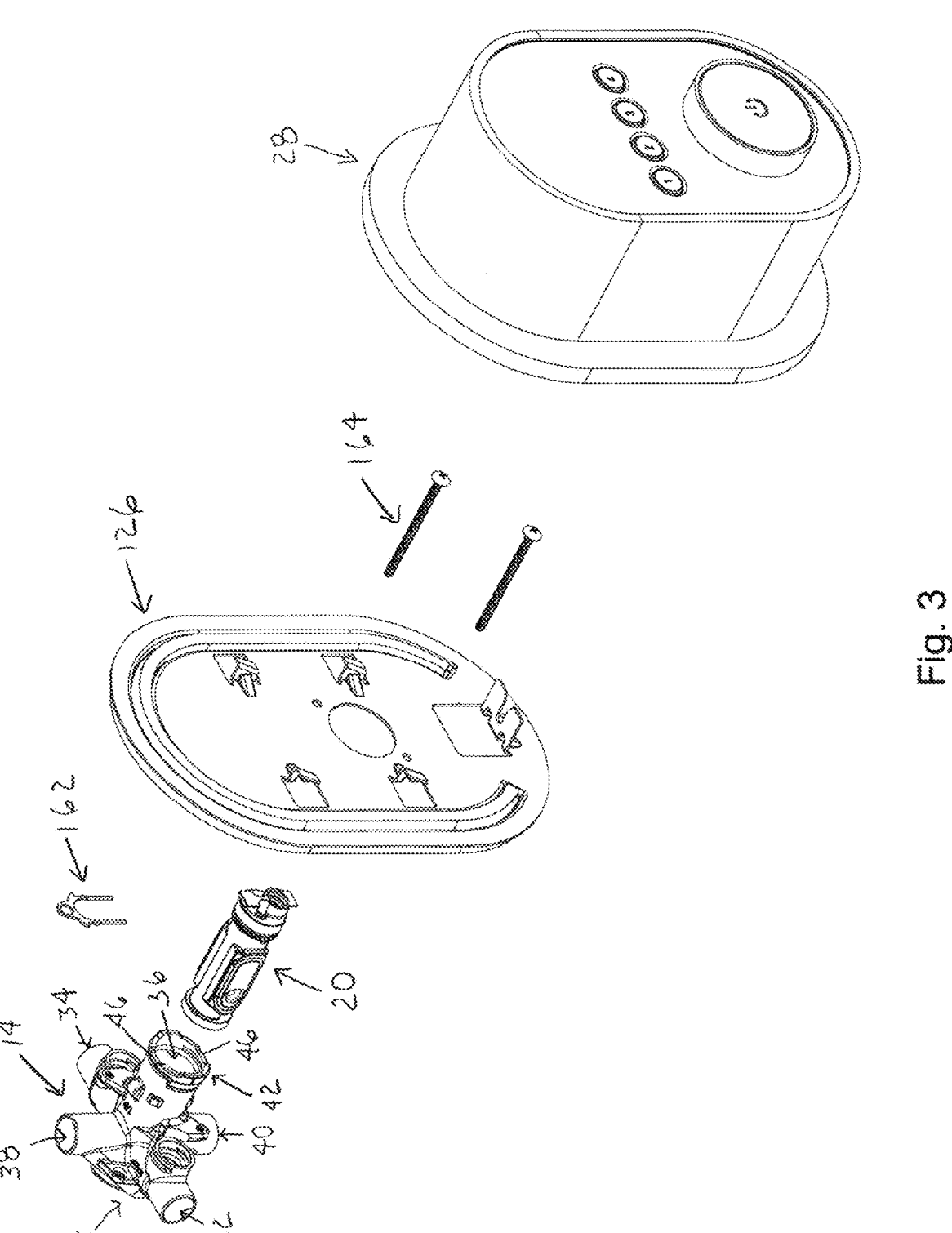
FIG. 3 is an exploded front left perspective view of the valve body and the retrofit assembly of the plumbing system of FIGS. 2a-2g.
Figure 4:
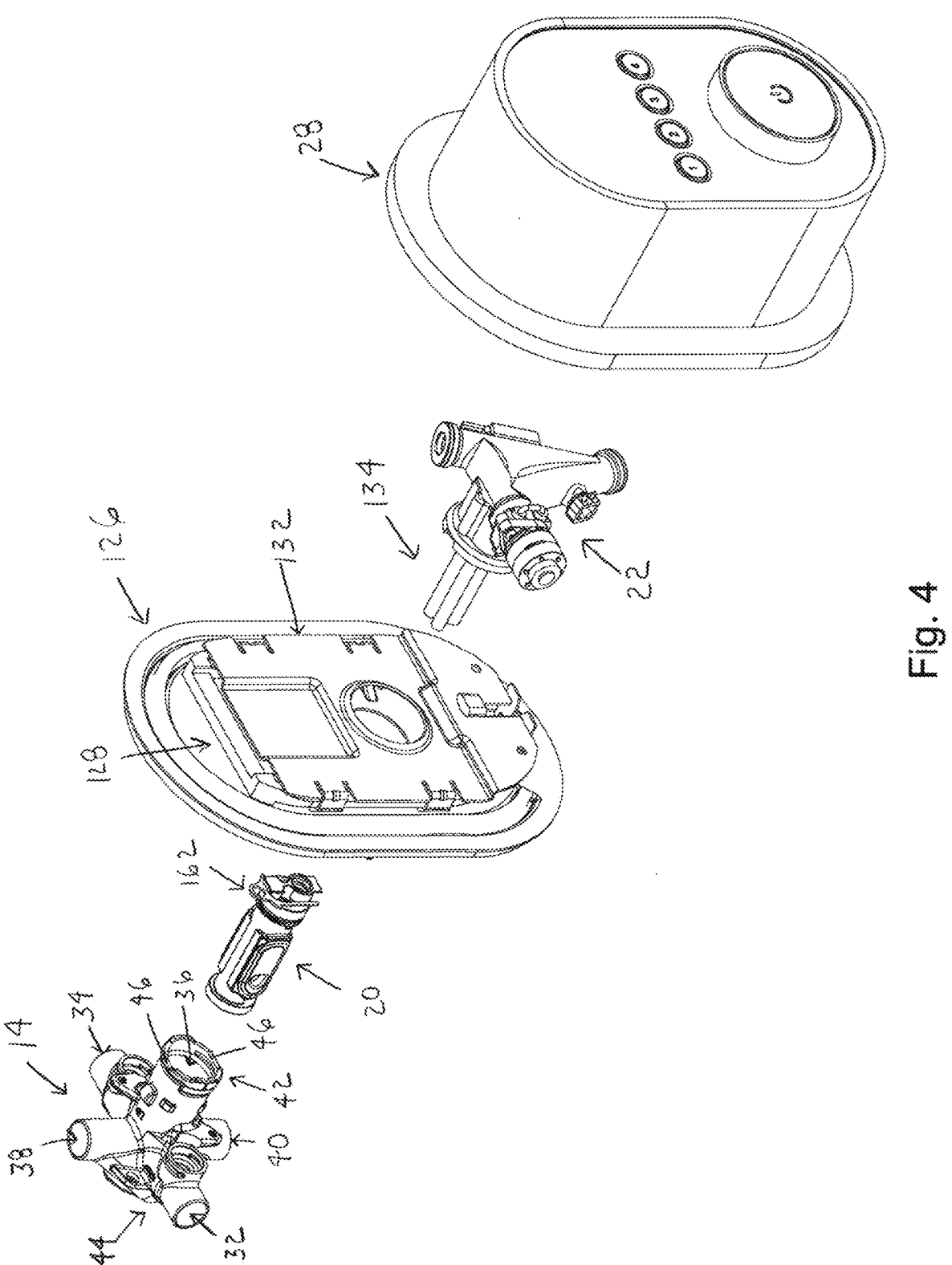
FIG. 4 is an additional exploded front left perspective view of the valve body and the retrofit assembly of the plumbing system of FIGS. 2a-2g.

The present invention provides a plumbing system operable to retrofit a mechanical system into an electronic system and, more specifically, a plumbing system with a mounting assembly operable to mount an electronic mixing assembly in front of a mounting surface.

Exemplary embodiments of a plumbing system 10 of the present invention are shown in detail in FIGS. 1-16. In the illustrated embodiments of FIGS. 1-16, the plumbing system 10 includes a first plumbing device PD1 (such as a showerhead 12), a valve body 14, a second plumbing device PD2 (such as a tub spout 16), and a retrofit assembly 18. Showerheads and tubs spouts are well known in the art and will not be described in greater detail. In the illustrated embodiments, the retrofit assembly 18 includes an adapter 20, a mixing assembly 22, a power module 24, a digital assembly 26, a housing 28, and a mounting assembly 30.

Exemplary embodiments of the valve body 14 are best shown in detail in FIGS. 2b, 3, 4, 5a, 10b-10c, 11b-11c, 12b-12c, and 13b-13c. In exemplary embodiments, the valve body 14 is operable to be mounted behind a mounting surface MS (such as a shower wall). In the illustrated embodiment, the valve body 14 includes a hot water inlet 32, a cold water inlet 34, a bore 36, a first mixed water outlet 38, and a second mixed water outlet 40. The hot water inlet 32 is operable to receive hot water from a hot water supply HS via a hot water supply pipe HP. The cold water inlet 34 is operable to receive cold water from a cold water supply CS via a cold water supply pipe CP. The first mixed water outlet 38 is operable to provide mixed water to the first plumbing device PD1 (such as the showerhead 12) via a first mixed water outlet pipe MP1. The second mixed water outlet 40 is operable to provide mixed water to the second plumbing device PD2 (such as the tub spout 16) via a second mixed water outlet pipe MP2. In the illustrated embodiment, the valve body 14 includes a front side 42 and a rear side 44. In an exemplary embodiment, the front side 42 of the valve body 14 includes at least one notch 46. In the illustrated embodiment, the front side 42 of the valve body 14 includes two notches 46.

In the exemplary and illustrated embodiments, certain components of the plumbing system 10 will be shown and described as having front and/or rear sides, ends, and/or other portions. As used herein, "front" refers to the side, end, and/or other portion that is closest to the mounting surface, and "rear" refers to the side, end, and/or other portion that is furthest from the mounting surface.

An exemplary embodiment of the adapter 20 is best shown in detail in FIGS. 3, 4, 5a, 6a-6h, 10b-10c, 11b-11c, 12b-12c, and 13b-13c. In exemplary embodiments, the adapter 20 is operable to be received in the valve body 14 behind the mounting surface. More specifically, the adapter 20 is operable to be received in the bore 36 of the valve body 14. In exemplary embodiments, the adapter 20 is operable to receive hot water from the hot water inlet 32 of the valve body 14 and cold water from the cold water inlet 34 of the valve body 14. In exemplary embodiments, the adapter 20 is operable to provide mixed water to the first mixed water outlet 38 of the valve body 14 and to the second mixed water outlet 40 of the valve body 14.

In the illustrated embodiment, the adapter 20 includes a hot water inlet bore 48, a cold water inlet bore 50, and a mixed water outlet bore 52. The hot water inlet bore 48 of the adapter 20 is operable to receive hot water from the hot water inlet 32 of the valve body 14. The cold water inlet bore 50 of the adapter 20 is operable to receive cold water from the cold water inlet 34 of the valve body 14. The mixed water outlet bore 52 is operable to provide mixed water to the first mixed water outlet 38 of the valve body 14 and to the second mixed water outlet 40 of the valve body 14.

In the illustrated embodiment, the adapter 20 further includes a hot water inlet bore seal 54, a cold water inlet bore seal 56, and a mixed water outlet bore seal 58. In the illustrated embodiment, the hot water inlet bore seal 54, the cold water inlet bore seal 56, and the mixed water outlet bore seal 58 of the adapter 20 are operable to be received at staggered depths within the hot water inlet bore 48, the cold water inlet bore 50, and the mixed water outlet bore 52 of the adapter 20, respectively. In an exemplary embodiment, the hot water inlet bore seal 54, the cold water inlet bore seal 56, and the mixed water outlet bore seal 58 are cup seals.

In the illustrated embodiment, the adapter 20 includes a front end 60 and a rear end 62. In an exemplary embodiment, the front end 60 of the adapter 20 includes at least one tab 64. In the illustrated embodiment, the front end 60 of the adapter 20 includes two tabs 64. The tab(s) 64 of the adapter 20 are operable to be received in the notch(es) 46 of the valve body 14 to prevent rotation of the adapter 20 in the bore 36 of the valve body 14.

An exemplary embodiment of the mixing assembly 22 is best shown in detail in FIGS. 4, 5a, 10a-10c, 11a-11c, 12a-12c, 13b-13c, and 14a-14f. In exemplary embodiments, the mixing assembly 22 is operable to fluidly communicate with the adapter 20. More specifically, the mixing assembly 22 is operable to receive hot water and cold water from the adapter 20 and provide mixed water to the adapter 20. In the illustrated embodiment, the mixing assembly 22 is operable to be received in the housing 28 in front of the mounting surface. As a result, mixing of the hot water and the cold water takes place in front of the mounting surface. In the illustrated embodiment, the mixing assembly 22 includes a waterway 66, an electronic valve 68, a flow sensor 70, and a temperature sensor 72.

An exemplary embodiment of the waterway 66 is best shown in detail in FIGS. 4, 5a, 10a-10c, 11a-11c, 12a-12c, 13b-13c, and 14a-14f. In exemplary embodiments, the waterway 66 is operable to fluidly communicate with the adapter 20. More specifically, the waterway 66 is operable to receive hot water and cold water from the adapter 20 and provide mixed water to the adapter 20. In the illustrated embodiment, the waterway 66 includes a mixing chamber 74 and a mixed water flow path 76.

An exemplary embodiment of the mixing chamber 74 is best shown in detail in FIGS. 10b, 11b, 12b, 13c, and 14e-14f. In exemplary embodiments, the mixing chamber 74 is operable to fluidly communicate with the adapter 20. More specifically, the mixing chamber 74 is operable to receive hot water and cold water from the adapter 20. In the illustrated embodiment, the mixing chamber 74 includes a hot water inlet 78, a cold water inlet 80, and a mixing cavity 82.

In exemplary embodiments, the mixing chamber 74 further includes a hot interface 84 between the hot water inlet 78 and the mixing cavity 82 and a cold interface 86 between the cold water inlet 80 and the mixing cavity 82. In the illustrated embodiment, the hot interface 84 is directly between the hot water inlet 78 and the mixing cavity 82, and the cold interface 86 is directly between the cold water inlet 80 and the mixing cavity 82. In the illustrated embodiment, the electronic valve 68 is not operable to seal against the hot interface 84 between the hot water inlet 78 and the mixing cavity 82 or the cold interface 86 between the cold water inlet 80 and the mixing cavity 82 and is not operable to prevent (i.e., completely shut off) flow of water from the hot water inlet 78 or the cold water inlet 80 to the mixing cavity 82.

In an exemplary embodiment, the mixing chamber 74 further includes a mixing sleeve in the mixing cavity 82. In the exemplary embodiment, the mixing sleeve includes a hot water opening and a cold water opening that align with the hot water inlet 78 and the cold water inlet 80, respectively, of the mixing chamber 74. In the exemplary embodiment, the hot interface 84 is indirectly between the hot water inlet 78 and the mixing cavity 82 and directly between the hot water opening of the mixing sleeve and the mixing cavity 82. Similarly, the cold interface 86 is indirectly between the cold water inlet 80 and the mixing cavity 82 and directly between the cold water opening of the mixing sleeve 82 and the mixing cavity 82.

An exemplary embodiment of the mixed water flow path 76 is best shown in detail in FIGS. 10b-10c, 11b-11c, 12b-12c, 13b-13c, and 14d-14f. In exemplary embodiments, the mixed water flow path 76 is operable to fluidly communicate with the mixing chamber 74. More specifically, the mixed water flow path 76 is operable to receive mixed water from the mixing chamber 74. In exemplary embodiments, the mixed water flow path 76 is operable to fluidly communicate with the adapter 20. More specifically, the mixed water flow path 76 is operable to provide mixed water to the adapter 20. In the illustrated embodiment, the mixed water flow path 76 includes a mixed water outlet 88.

In exemplary embodiments, the waterway 66 further includes a mixed interface 90 between the mixing chamber 74 and the mixed water flow path 76. In the illustrated embodiment, the electronic valve 68 is operable to seal against the mixed interface 90 between the mixing chamber 74 and the mixed water flow path 76 and to prevent (i.e., completely shut off) flow of water from the mixing chamber 74 to the mixed water flow path 76.

An exemplary embodiment of the electronic valve 68 is best shown in detail in FIGS. 4, 5a, 10a-10c, 11a-11c, 12a-12c, 13b-13c, and 14a-14f. In exemplary embodiments, the electronic valve 68 is operable to control flow of hot water and cold water from the adapter 20 to the mixing chamber 74. More specifically, the electronic valve 68 is operable to control flow of hot water from the adapter 20 through the hot water inlet 78 (and, where included, the hot water opening in the mixing sleeve) of the mixing chamber 74 and cold water from the adapter 20 through the cold water inlet 80 (and, where included, the cold water opening in the mixing sleeve) of the mixing chamber 74 to the mixing cavity 82 of the mixing chamber 74. In exemplary embodiments, the electronic valve 68 is operable to control flow of mixed water from the mixing chamber 74 to the mixed water flow path 76. More specifically, the electronic valve 68 is operable to control flow of mixed water from the mixing cavity 82 of the mixing chamber 74 to the mixed water flow path 76.

In the illustrated embodiment, the electronic valve 68 includes a motor 92 (such as a stepper motor) and a spool 94. In the illustrated embodiment, the motor 92 is operable to move the spool 94 in the mixing chamber 74. In an exemplary embodiment, the electronic valve 68 includes a single motor 92.

In a first (no flow) position when the spool 94 is in a fully forward position, the spool 94 is seated in the mixed interface 90 between the mixing chamber 74 and the mixed flow water path and prevents (i.e., blocks) flow of water from the mixing chamber 74 to the mixed water flow path 76.

In a second (cold flow) position when the spool 94 is in a fully rearward position, the spool 94 is primarily preventing (i.e., blocking) flow of hot water from the hot water inlet 78 (and, where included, the hot water opening in the mixing sleeve) of the mixing chamber 74 and primarily permitting (i.e., not blocking) flow of cold water from the cold water inlet 80 (and, where included, the cold water opening in the mixing sleeve) of the mixing chamber 74 to the mixed water flow path 76.

In a third (hot flow) position when the spool 94 is in an approximately mid position, the spool 94 is primarily preventing (i.e., blocking) flow of cold water from the cold water inlet 80 (and, where included, the cold water opening in the mixing sleeve) of the mixing chamber 74 and primarily permitting (i.e., not blocking) flow of hot water from the hot water inlet 78 (and, where included, the hot water opening in the mixing sleeve) of the mixing chamber 74 to the mixed water flow path 76.

In positions between the second (cold flow) position and the third (hot flow) position, the spool 94 is preventing (i.e., blocking) varying amounts of flow of hot water from the hot water inlet 78 (and, where included, the hot water opening in the mixing sleeve) of the mixing chamber 74 and cold water from the cold water inlet 80 (and, where included, the cold water opening in the mixing sleeve) of the mixing chamber 74 and thus permitting (i.e., not blocking) varying amounts of flow of hot water from the hot water inlet 78 (and, where included, the hot water opening in the mixing sleeve) of the mixing chamber 74 and cold water from the cold water inlet 80 (and, where included, the cold water opening in the mixing sleeve) of the mixing chamber 74 resulting in varying temperatures of water flow to the mixed water flow path 76.

In exemplary embodiments, control of the temperature of water flowing through the plumbing system 10 (i.e., the mixing of water) and control of the flow of water through the plumbing system 10 (i.e., the shut off of water) are controlled by the same component (e.g., the electronic valve 68 and, more specifically, the spool 94).

In exemplary embodiments, control of the temperature of water flowing through the plumbing system 10 (i.e., the mixing of water) and control of the flow of water through the plumbing system 10 (i.e., the shut off of water) are occurring in the same component (e.g., the mixing chamber 74 and, more specifically, the mixing cavity 82).

Figure 14A:
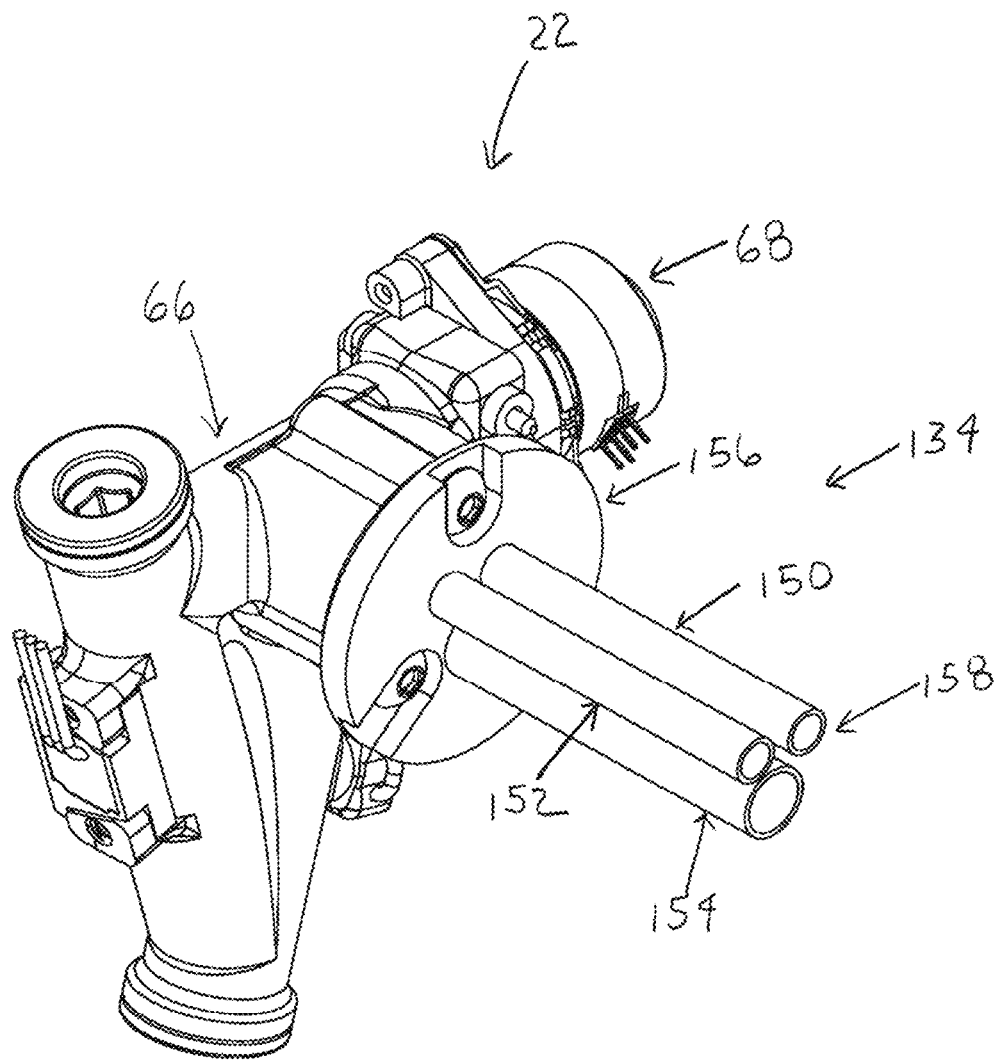
FIGS. 14a-14f are assembled views of the mixing assembly and a tube assembly of FIGS. 2a-2g
Figure 14B:
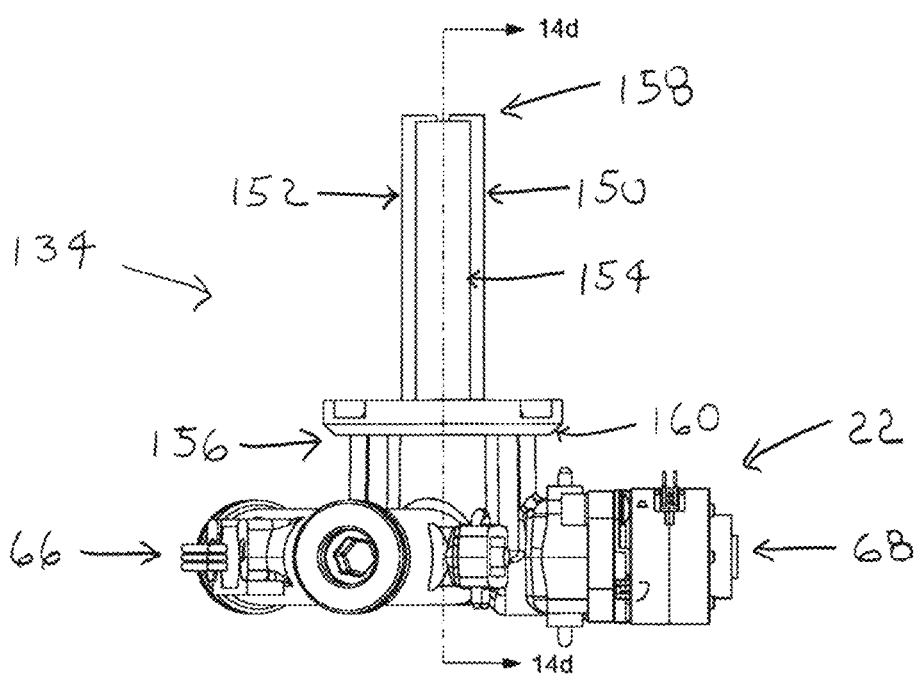
Figure 14C:
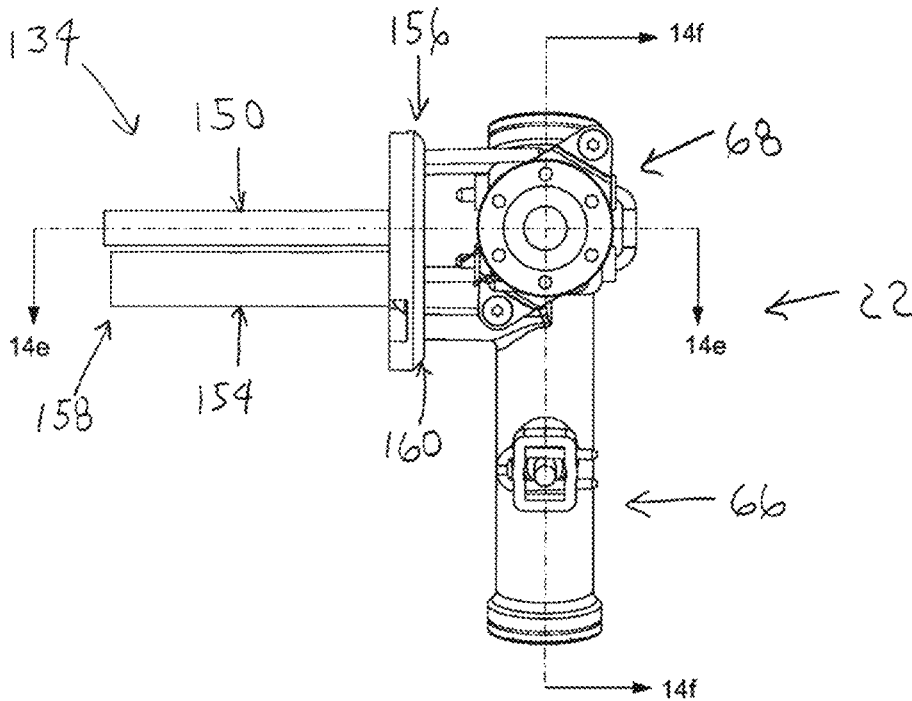
Figure 14D:
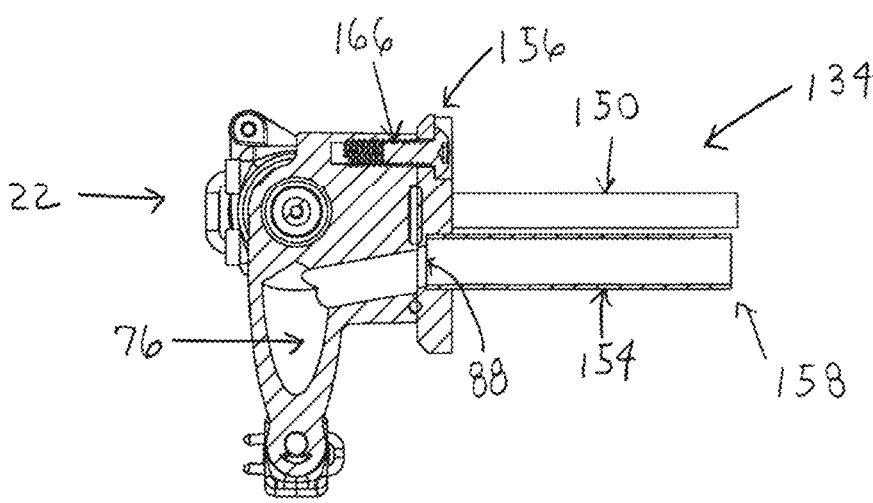
Figure 14E:
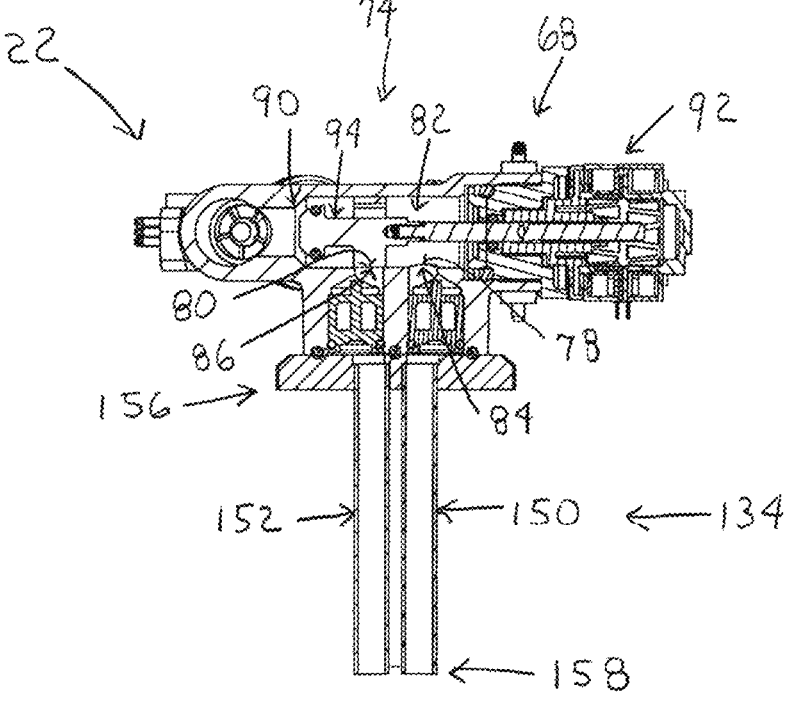
Figure 14F:
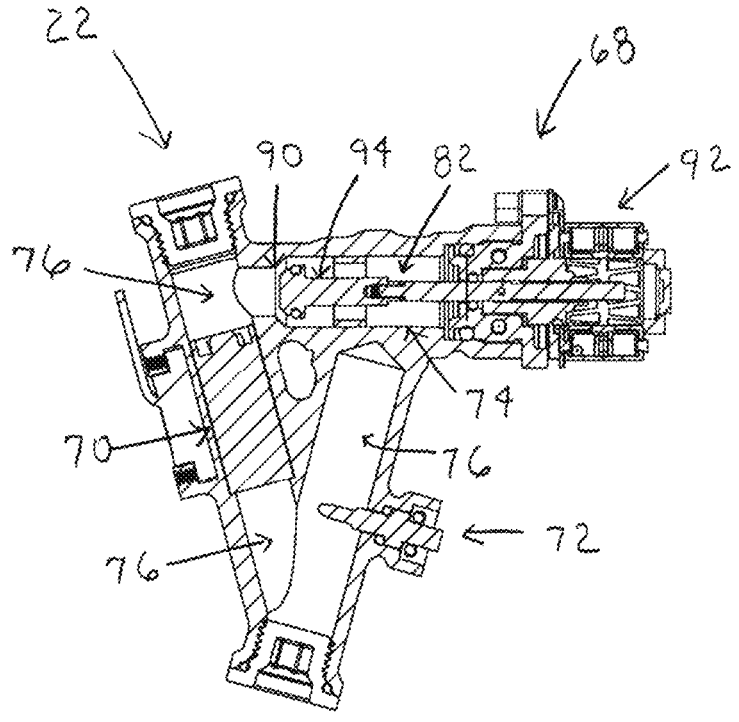
Figure 15:
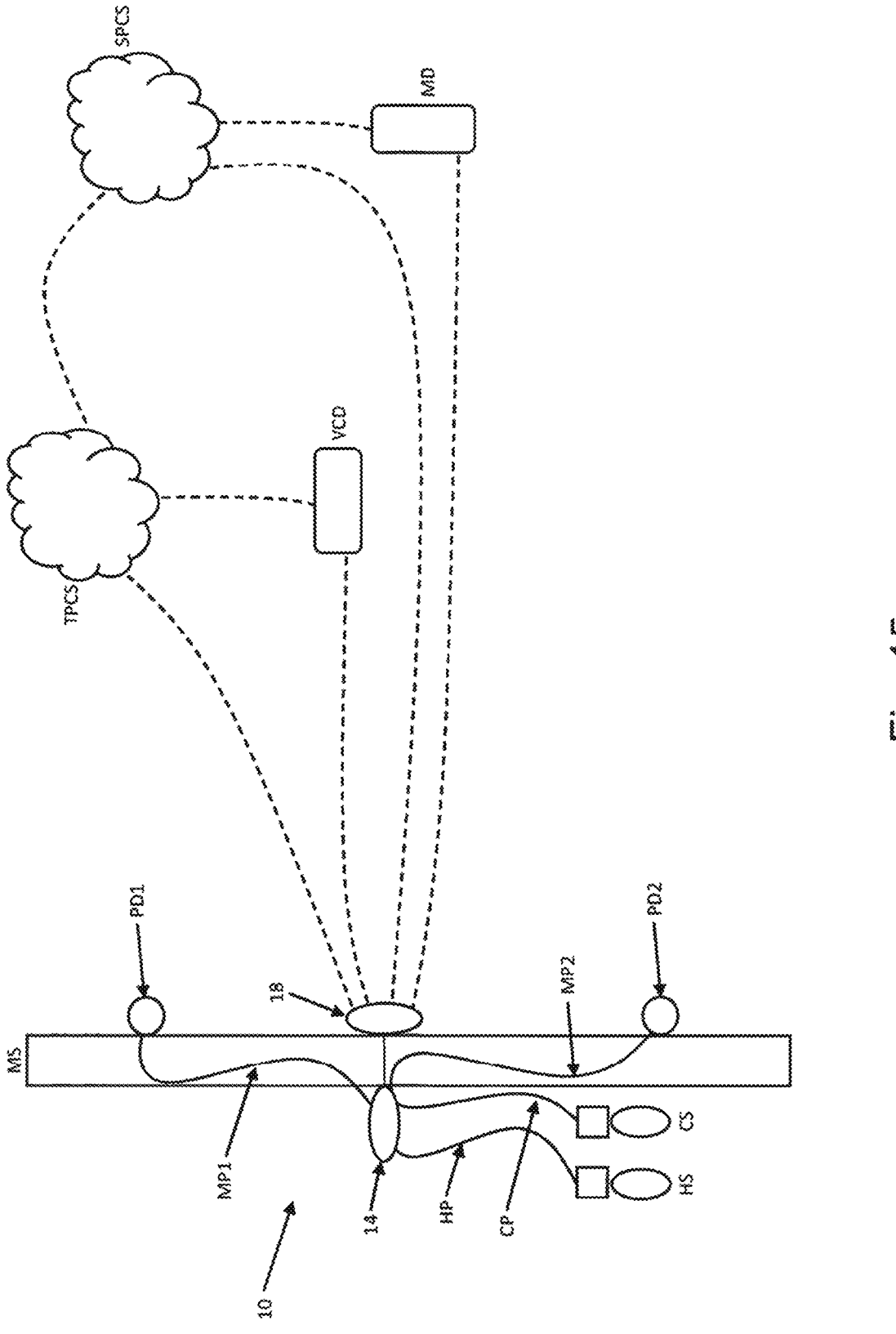
FIG. 15 is a schematic illustration of a plumbing system according to an exemplary embodiment of the present invention.

An exemplary embodiment of the flow sensor 70 is best shown in detail in FIG. 14*f*. In exemplary embodiments, the flow sensor 70 is operable to detect a flow rate of mixed water flowing through the waterway 66. In exemplary embodiments, the electronic valve 68 is operable to control flow of hot water and cold water from the adapter 20 to the waterway 66 based on the detected flow rate of mixed water flowing through the waterway 66. In the illustrated embodiment, the flow sensor 70 is located downstream of the mixing chamber 74 of the waterway 66. In the illustrated embodiment, the flow sensor 70 is located in the mixed water flow path 76 of the waterway 66.

An exemplary embodiment of the temperature sensor 72 is best shown in detail in FIG. 14*f*. In exemplary embodiments, the temperature sensor 72 is operable to detect a temperature of mixed water flowing through the waterway 66. In exemplary embodiments, the electronic valve 68 is operable to control flow of hot water and cold water from the adapter 20 to the waterway 66 based on the detected temperature of mixed water flowing through the waterway 66. In the illustrated embodiment, the temperature sensor 72 is located downstream of the mixing chamber 74 of the waterway 66. In the illustrated embodiment, the temperature sensor 72 is located in the mixed water flow path 76 of the waterway 66.

Figure 5A:
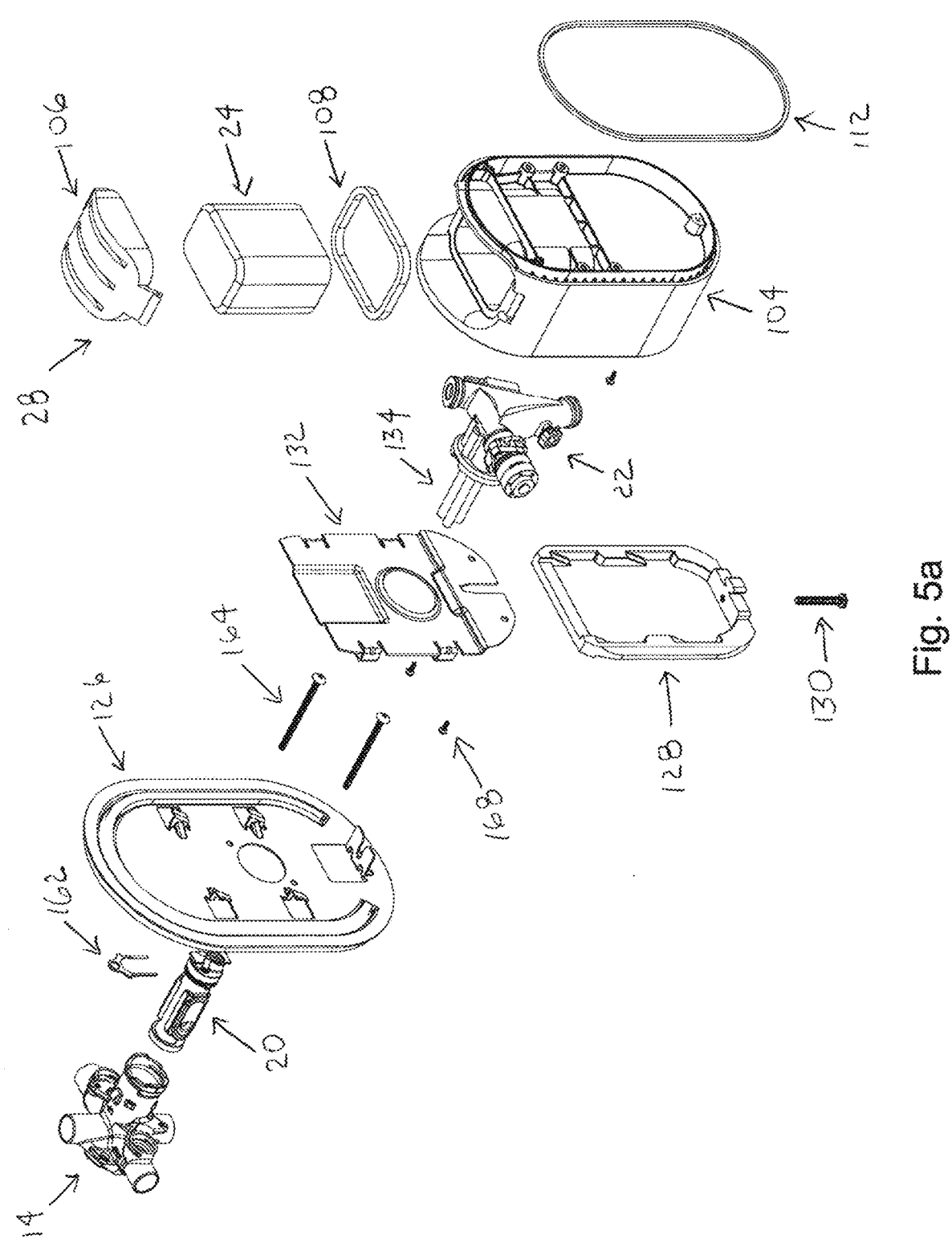
FIGS. 5a and 5b collectively are a further exploded front left perspective view of the valve body and the retrofit assembly of the plumbing system of FIGS. 2a-2g.
Figure 16:
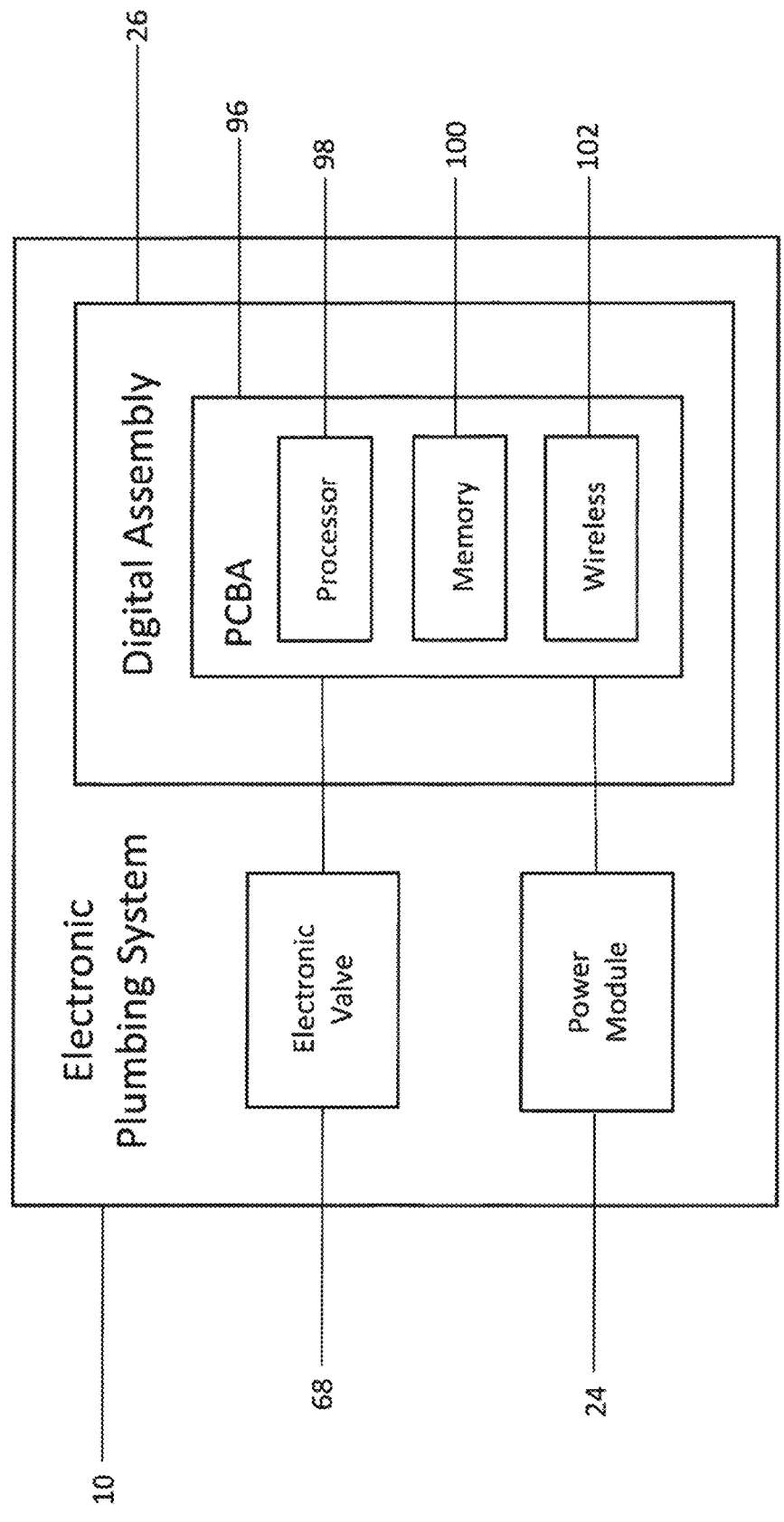
FIG. 16 is a schematic illustration of electrical/electronic components of a plumbing system according to an exemplary embodiment of the present invention.

Exemplary embodiments of the power module 24 are best shown in detail in FIGS. 5*a* and 16. In exemplary embodiments, the power module 24 is operable to provide power to the electronic valve 68. In the illustrated embodiment, the power module 24 is operable to be received in the housing 28 in front of the mounting surface. In an exemplary embodiment, the power module 24 includes a battery.

Figure 5B:
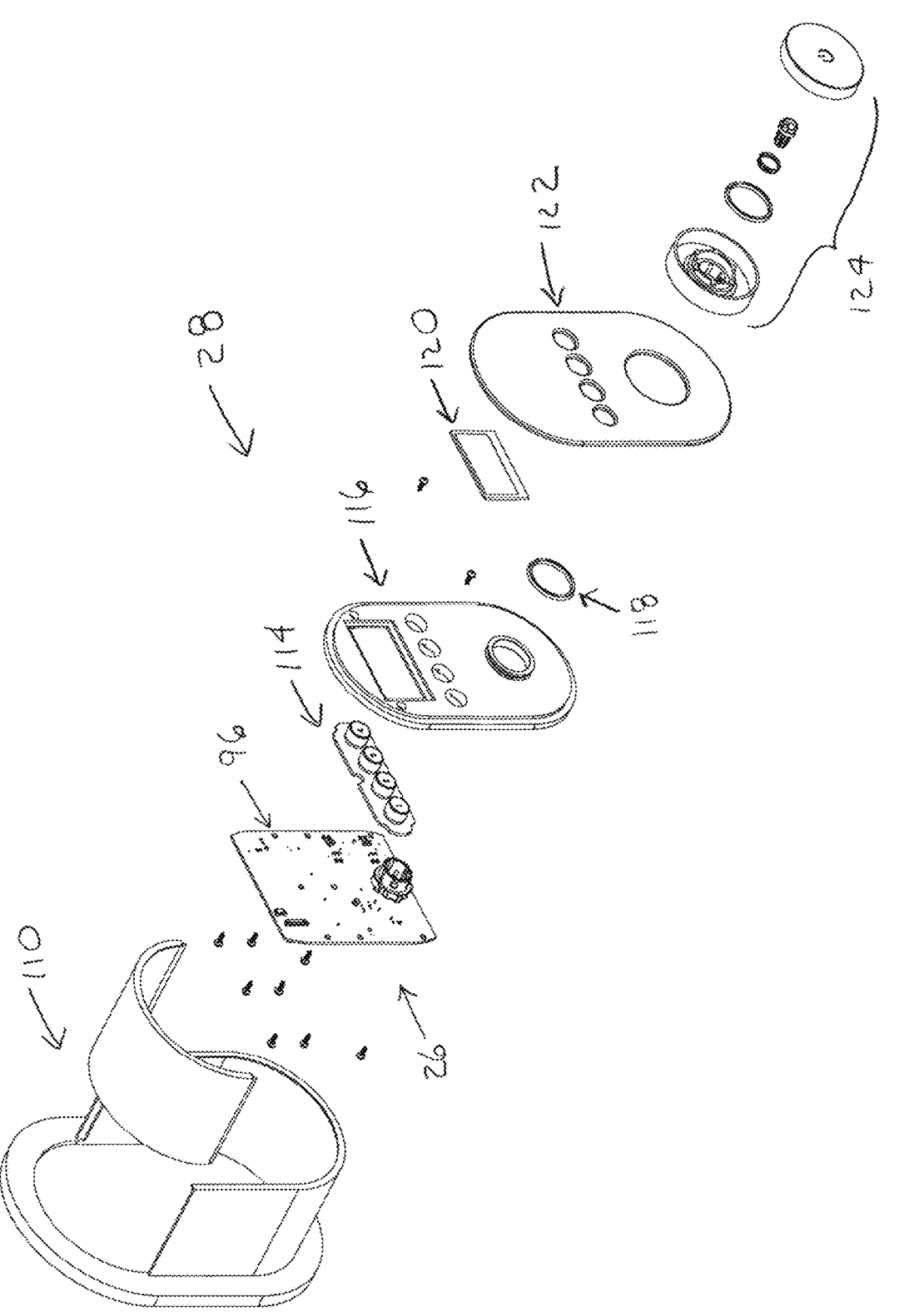
Figure 6A:
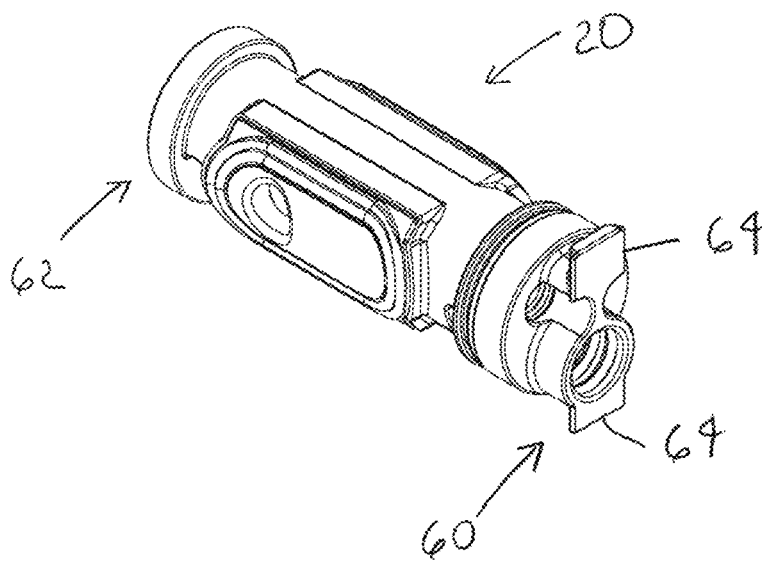
FIGS. 6a-6h are views of an adapter of the plumbing system of FIGS. 2a-2g
Figure 6B:
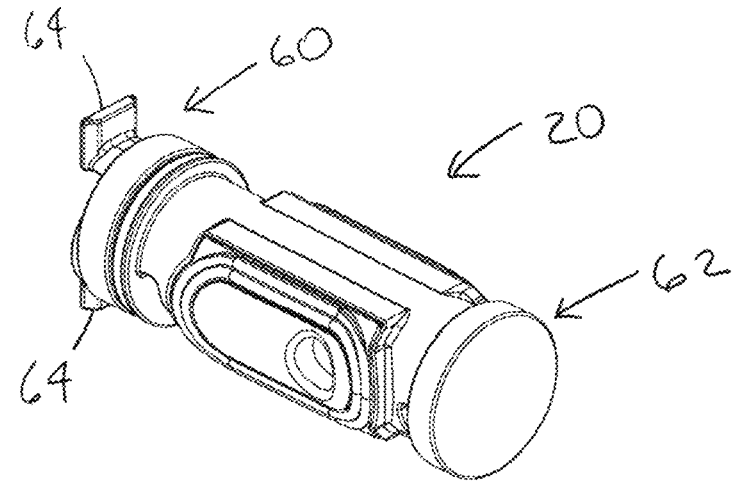
Figures 6C, 6D, 6E, 6F, 6G:
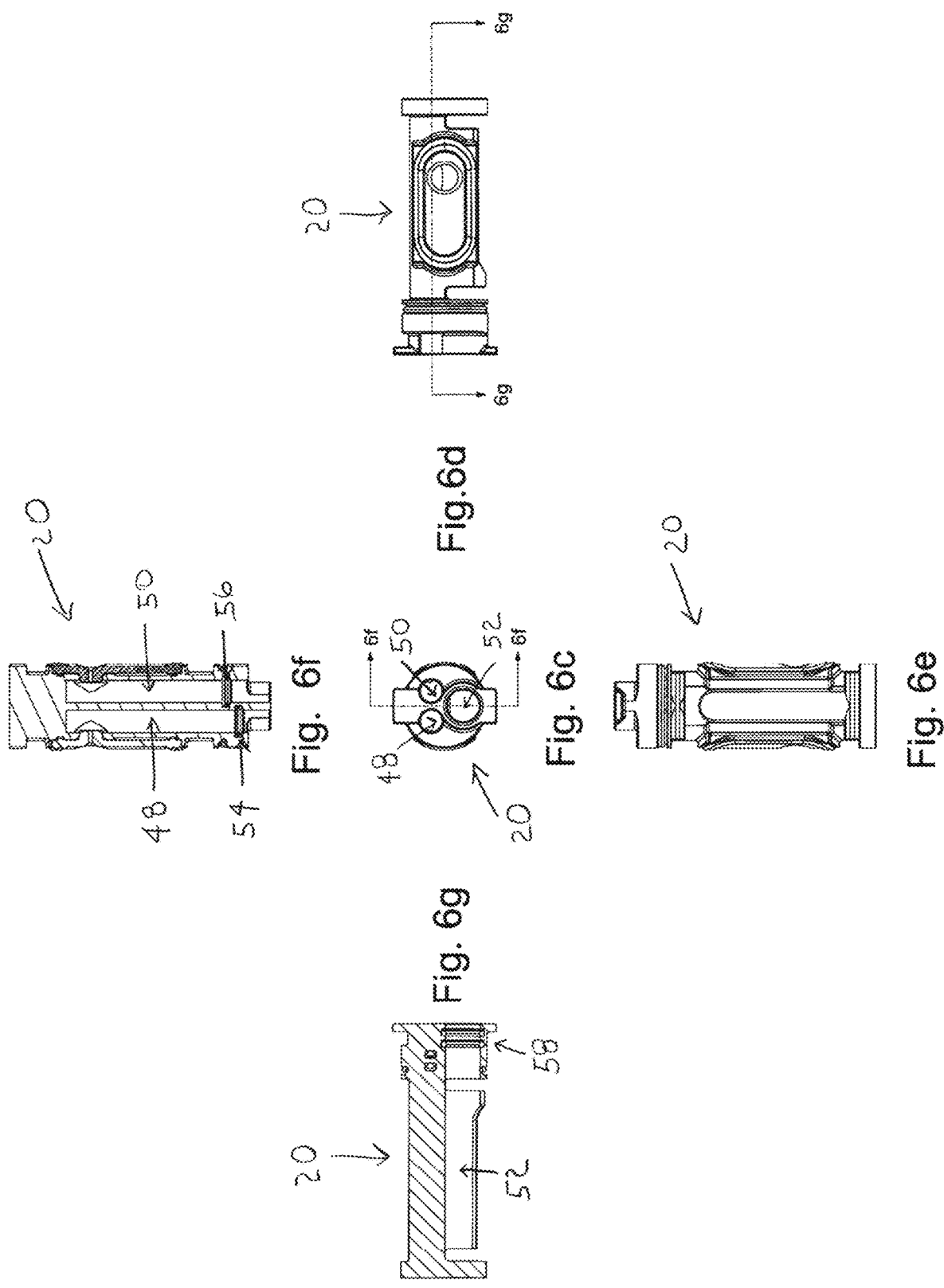
Figure 6H:
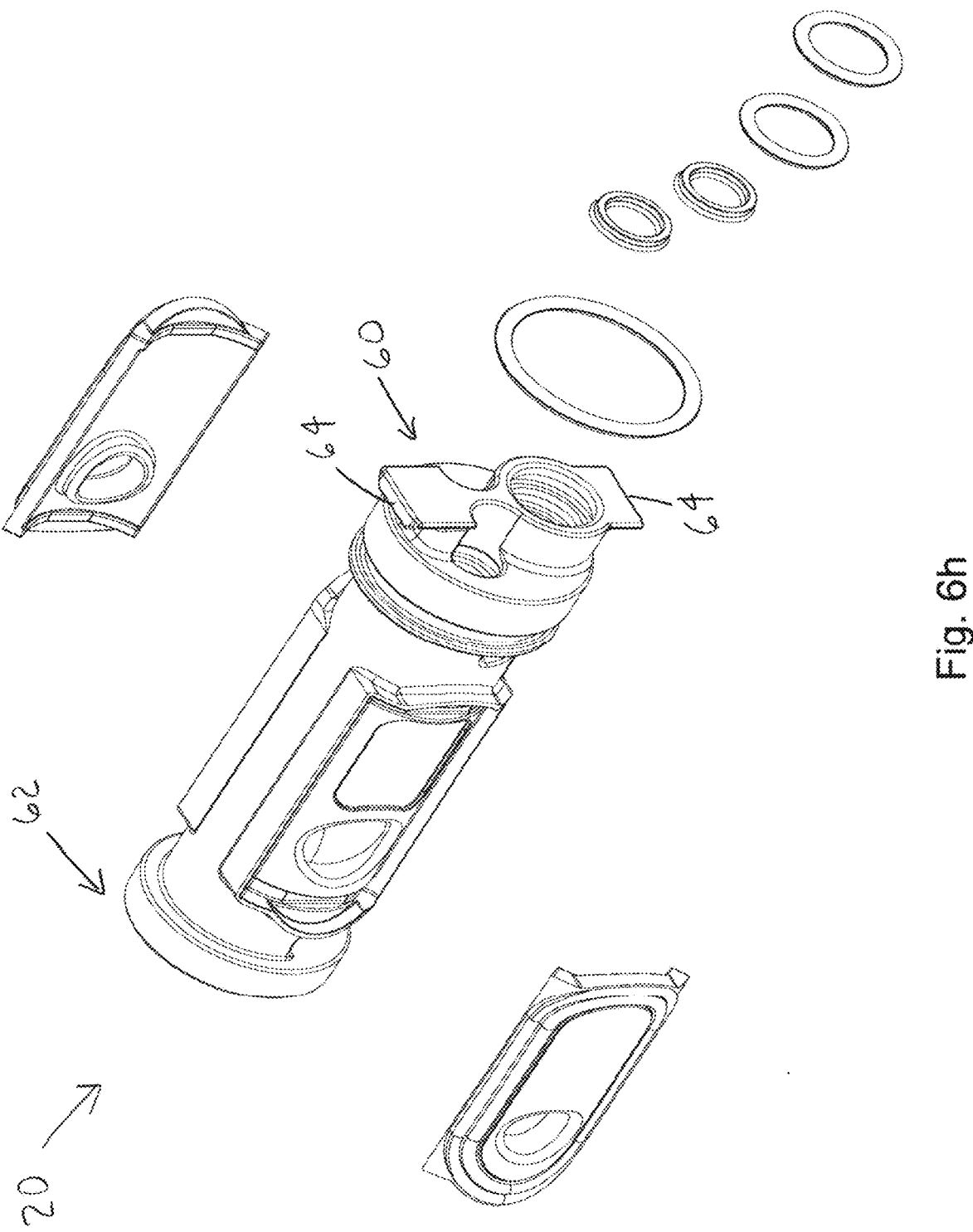
Figure 7:
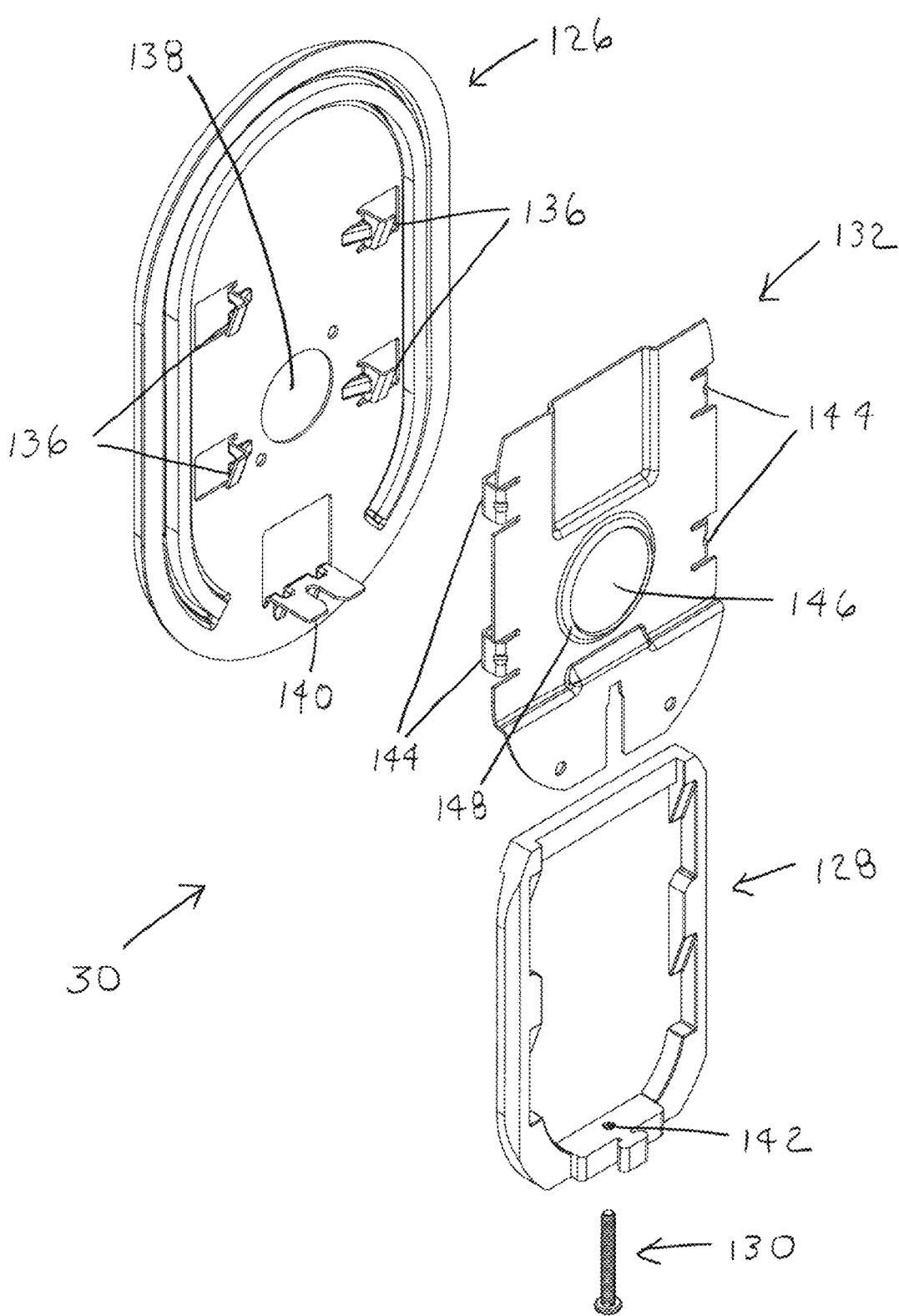
FIG. 7 is an exploded front left perspective view of components of a mounting assembly of the plumbing system of FIGS. 2a-2g.
Figure 8A:
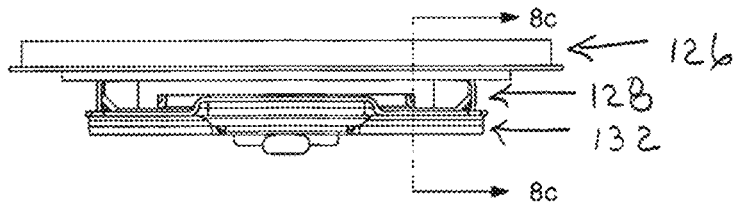
FIGS. 8a-8f are assembled views of the components of the mounting assembly of FIG. 7 in an unengaged state
Figure 8B:
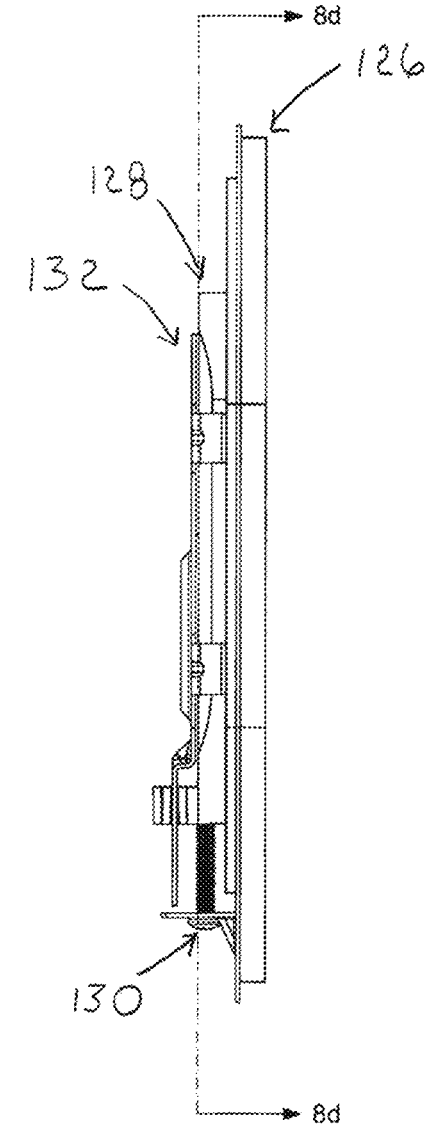
Figures 8C, 8D:
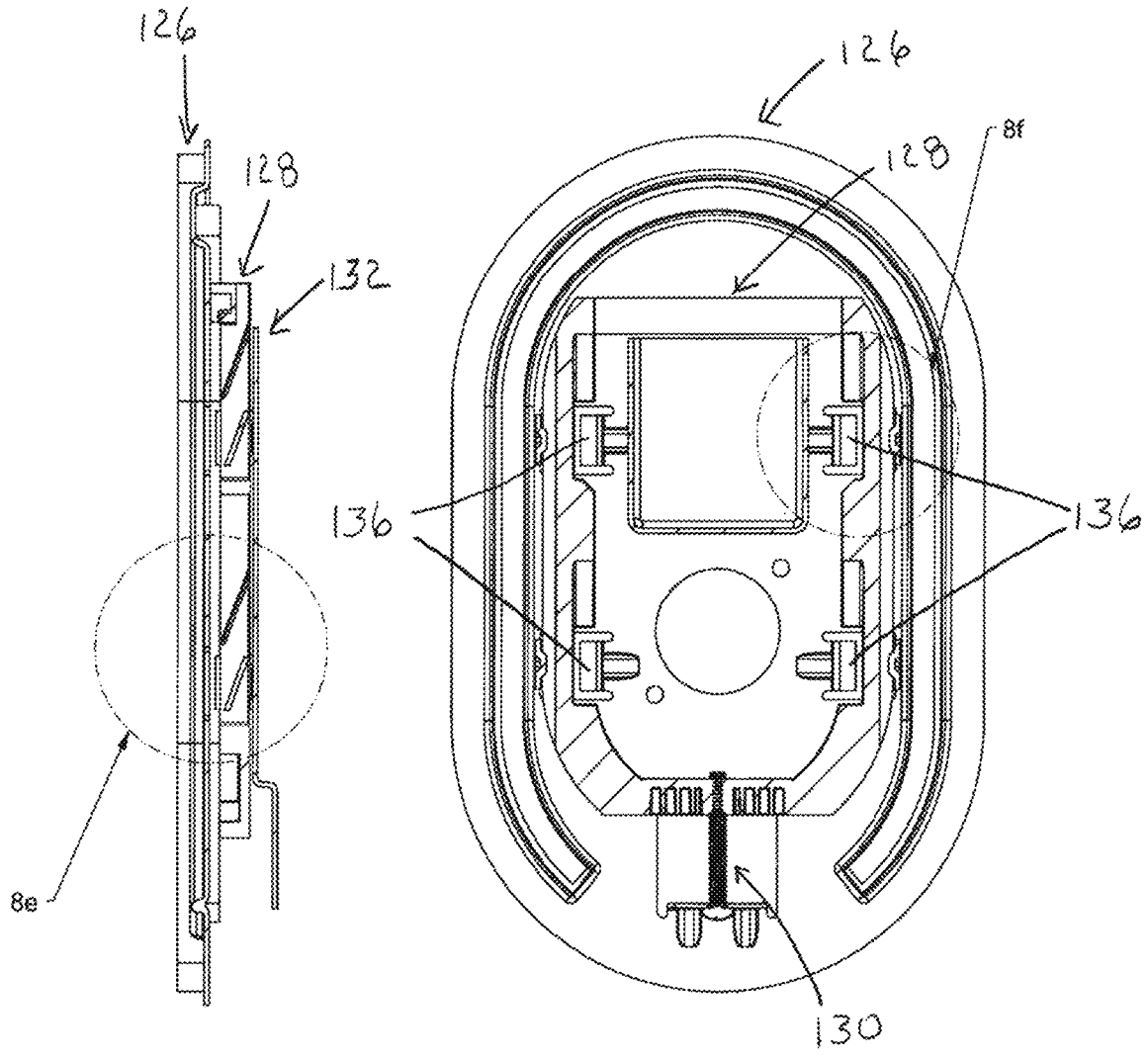
Figure 8E:
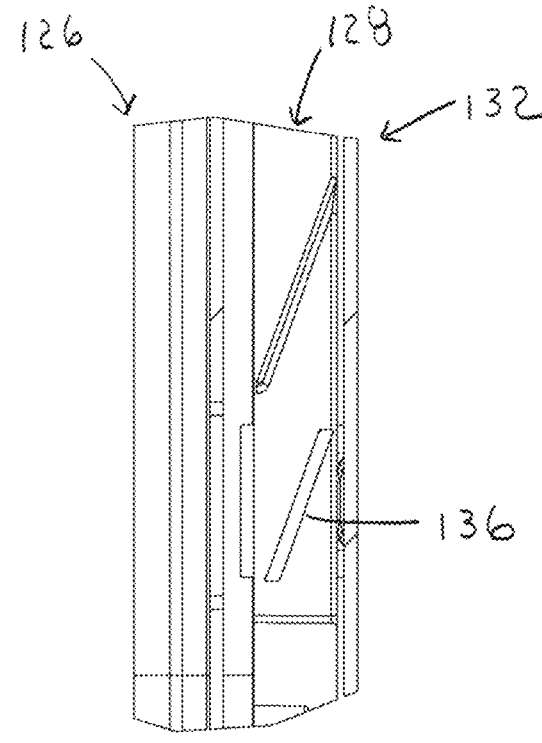
Figure 8F:
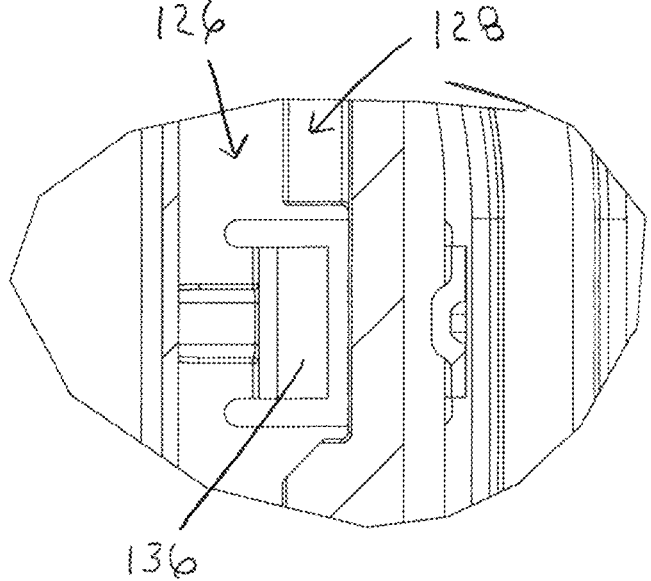
Figure 9A:
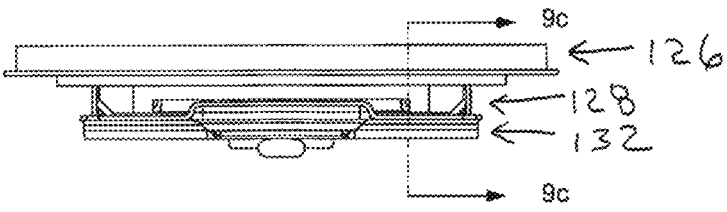
Figure 9B:
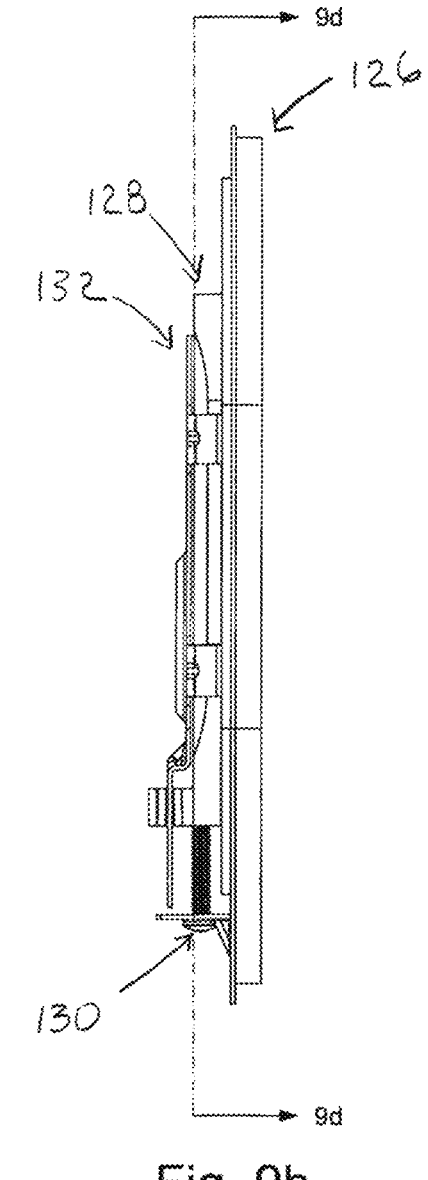
Figure 9E:
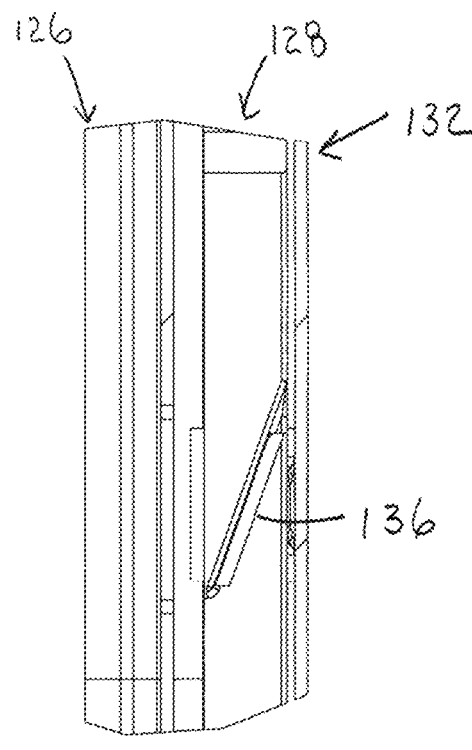
Figure 9F:
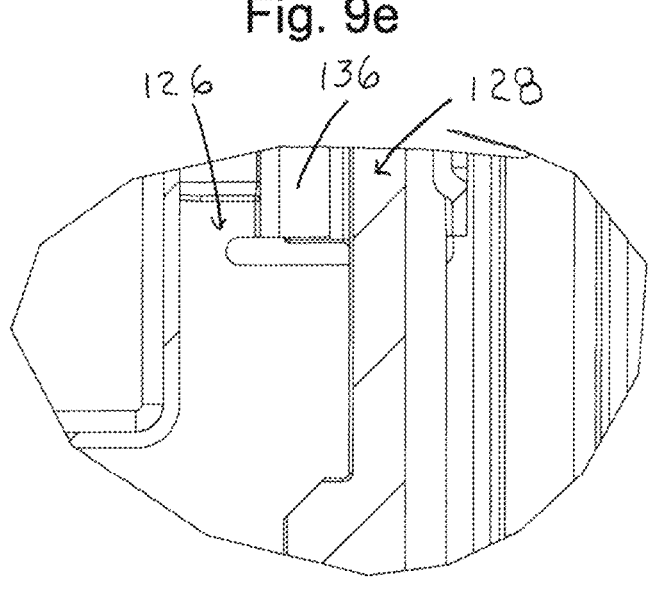
Figure 10A:
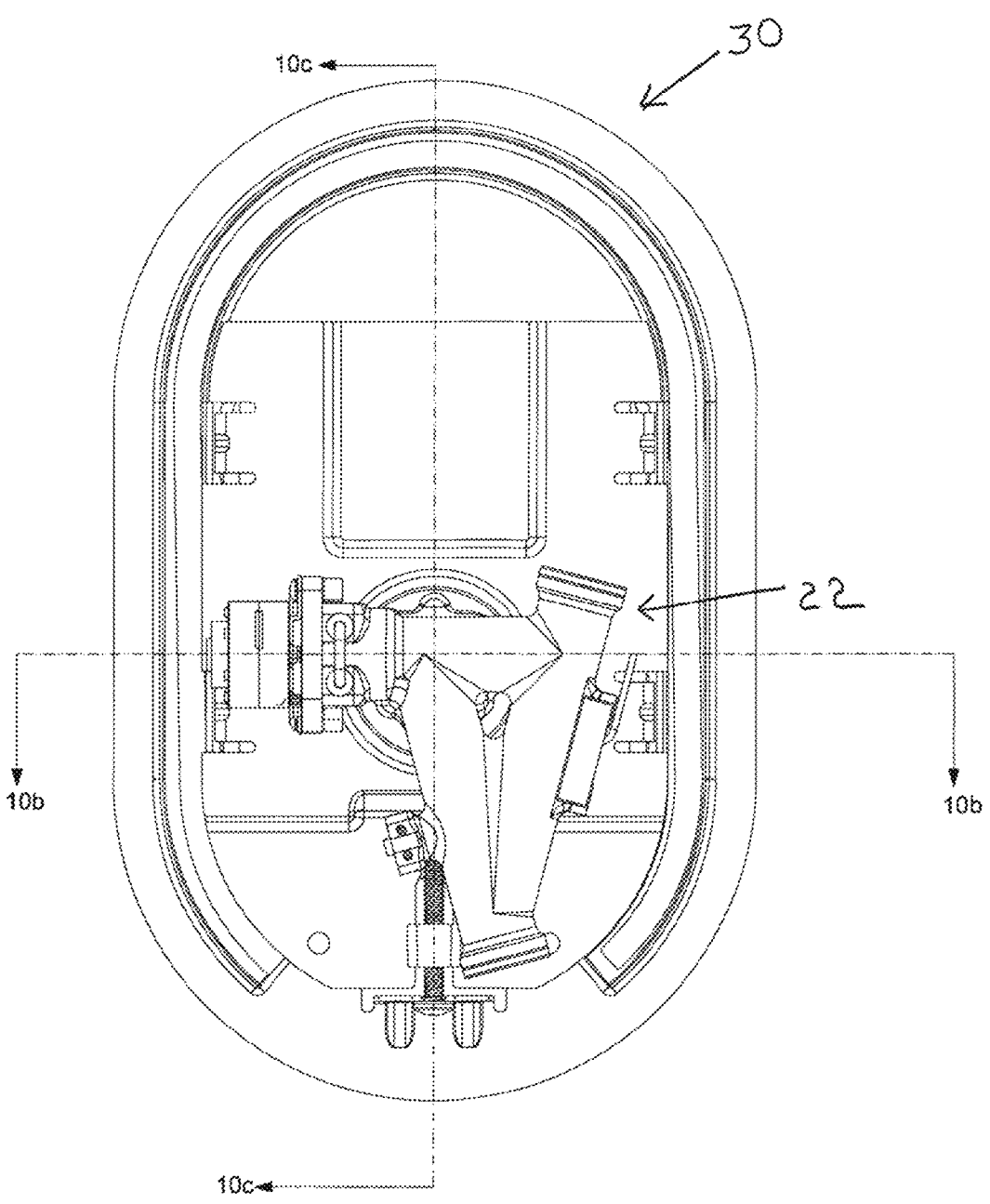
FIGS. 10a-10c are installed views of the valve body, the mounting assembly, and a mixing assembly of FIGS. 2a-2g in a close/flat wall configuration
Figure 10B:
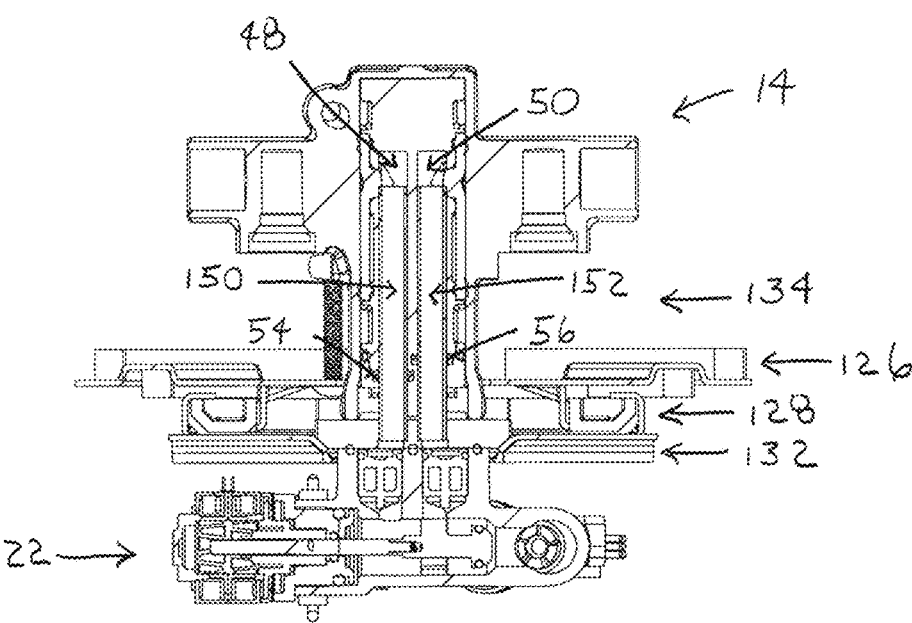
Figure 10C:
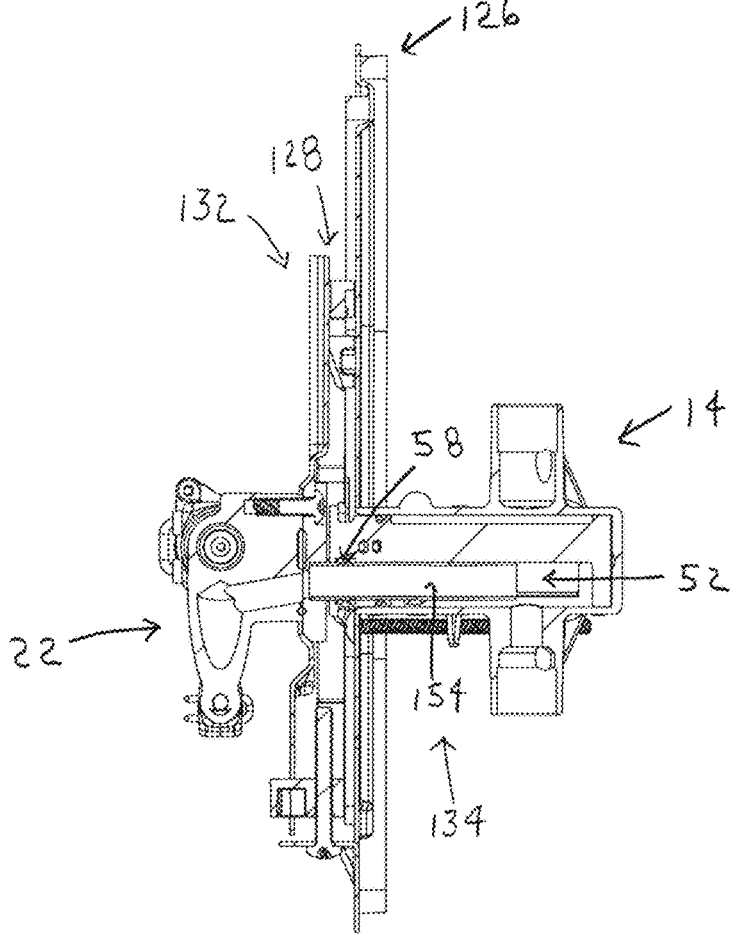
Figure 11A:
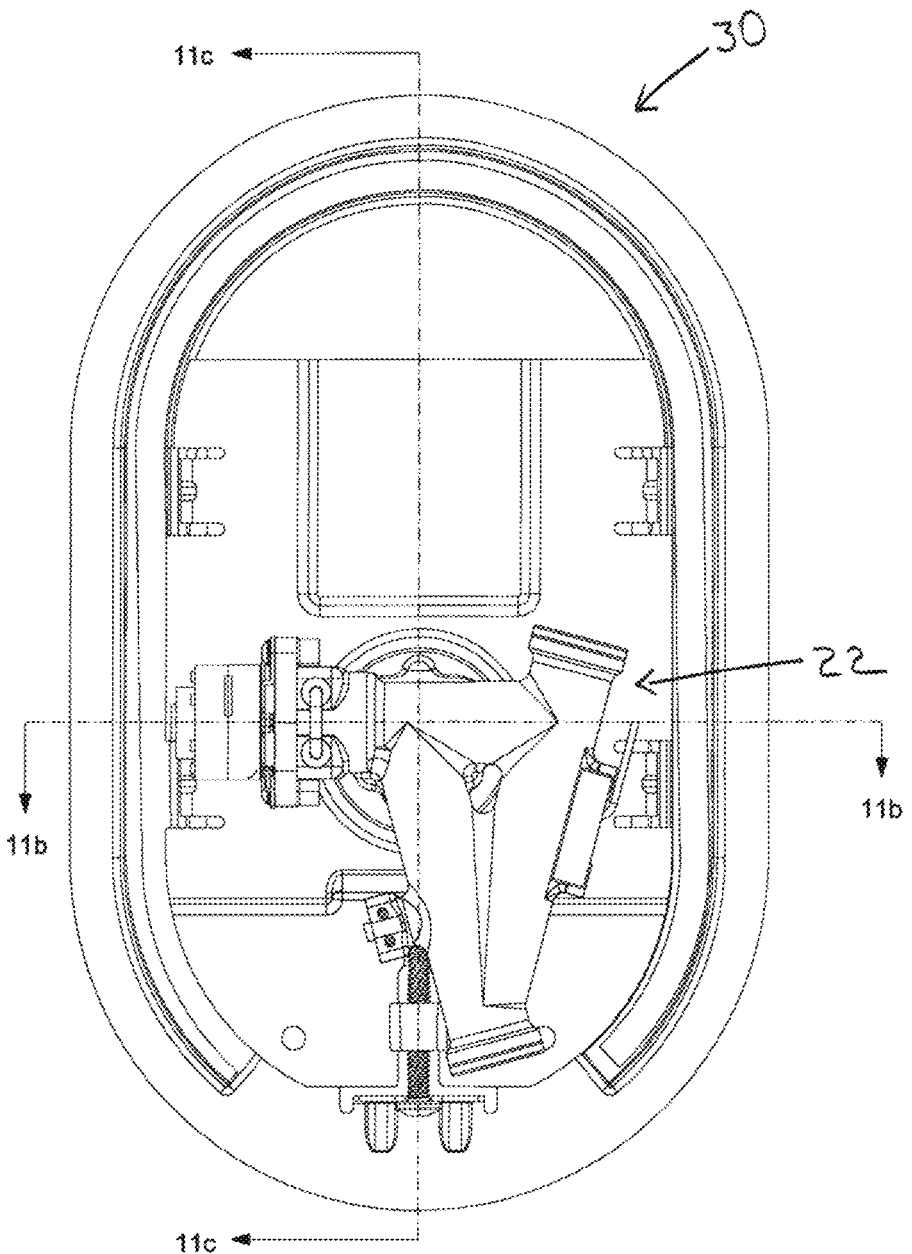
FIGS. 11a-11c are installed views of the valve body, the mounting assembly, and the mixing assembly of FIGS. 2a-2g in a far/flat wall configuration
Figures 11B, 11C:
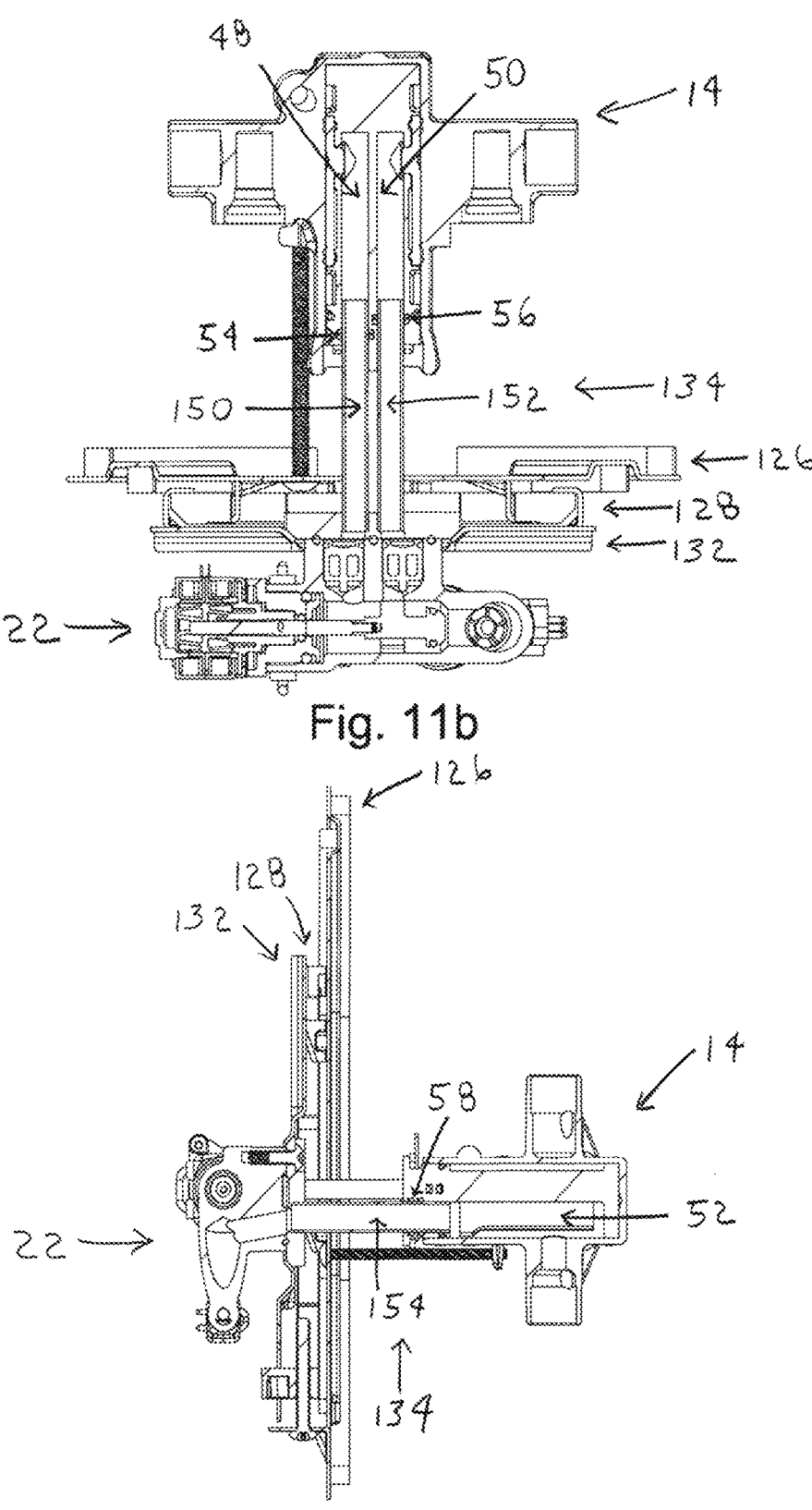

Exemplary embodiments of the digital assembly 26 are best shown in detail in FIGS. 5*b* and 16. In exemplary embodiments, the digital assembly 26 is operable to electronically communicate with the mixing assembly 22. More specifically, the digital assembly 26 is operable to receive signals from components of the mixing assembly 22 and provide signals to components of the mixing assembly 22. In the illustrated embodiment, the digital assembly 26 is operable to be received in the housing 28 in front of the mounting surface. In the illustrated embodiments, the mixing assembly 22 includes a printed circuit board assembly ("PCBA") 96. In the illustrated embodiments, the digital assembly 26 includes a processor 98, memory 100, and a wireless communication chip or module 102 mounted on the PCBA 96. In exemplary embodiments, the digital assembly 26 includes other components mounted on the PCBA 96. All these components are well known and will not be described in greater detail.

In exemplary embodiments, the digital assembly 26 communicates with components outside the plumbing system 10. For example, the digital assembly 26 could communicate with a mobile device MD, a voice controlled device VCD, a system provider cloud server SPCS, and/or a third party cloud server TPCS. Communications of this type in a plumbing system are well known in the art. For example, communications of this type are disclosed in U.S. Patent App. Pub. No. 2024/0105042, assigned to Fortune Brands Water Innovations LLC, the entire disclosure of which is hereby incorporated by reference. Communications of this type will not be described in greater detail.

In exemplary embodiments, the flow sensor 70 of the mixing assembly 22 is operable to detect the flow rate of mixed water flowing through the waterway 66 and to send a signal indicating the detected flow rate to the processor 98 of the digital assembly 26. The processor 98 is operable to receive the flow rate signal from the flow sensor 70.

In exemplary embodiments, the temperature sensor 72 of the mixing assembly 22 is operable to detect the temperature of mixed water flowing through the waterway 66 and to send a signal indicating the detected temperature to the processor 98 of the digital assembly 26. The processor 98 is operable to receive the temperature signal from the temperature sensor 72.

In exemplary embodiments, the processor 98 of the digital assembly 26 is operable to send a control signal to the electronic valve 68 of the mixing assembly 22 based (at least in part) on the flow rate signal and/or the temperature signal. The electronic valve 68 is operable to receive the control signal from the processor 98 and to control the motor 92 (and, thus, the spool 94) to adjust the flow rate and/or the temperature of the mixed water flowing through the waterway 66.

An exemplary embodiment of the housing 28 is best shown in detail in FIGS. 1, 2*a*-2*g*, 3, 4, 5*a*-5*b*, and 13*a*-13*c*. In exemplary embodiments, the housing 28 is operable to be mounted in front of the mounting surface. In the illustrated embodiment, the housing 28 includes a body 104, a lid 106, a lid gasket 108, trim 110, a trim gasket 112, control buttons 114, a face plate 116, an O-ring 118, a screen 120 (such as a liquid crystal display ("LCD") screen), a glass plate 122, and a control knob 124. In an exemplary embodiment, the housing 28 is primarily made of plastic.

An exemplary embodiment of the mounting assembly 30 is best shown in detail in FIGS. 2*b*, 3, 4, 5*a*, 7, 8*a*-8*f*, 9*a*-9*f*, 10*a*-10*c*, 11*a*-11*c*, 12*a*-12*c*, 13*b*-13*c*, and 14*a*-14*e*. In exemplary embodiments, the mounting assembly 30 is operable to secure the mixing assembly 22 in the housing 28 relative to the adapter 20 in the valve body 14. In exemplary embodiments, the mounting assembly 30 is operable to mount the housing 28 to the valve body 14. In the illustrated embodiment, the mounting assembly 30 include a mounting plate 126, a mounting wedge 128, a mounting fastener 130 (such as a mounting screw), a connecting plate 132, and a tube assembly 134.

An exemplary embodiment of the mounting plate 126 is best shown in detail in FIGS. 2*b*, 3, 4, 5*a*, 7, 8*a*-8*f*, 9*a*-9*f*, 10*a*-10*c*, 11*a*-11*c*, 12*a*-12*c*, and 13*b*-13*c*. In exemplary embodiments, the mounting plate 126 is operable to be attached to the valve body 14. In an exemplary embodiment, the mounting plate 126 includes at least one clamp 136. In the illustrated embodiment, the mounting plate 126 includes four clamps 136. In the illustrated embodiment, the mounting plate 126 includes an opening 138. In the illustrated embodiment, the mounting plate 126 includes a fastener tab 140.

An exemplary embodiment of the mounting wedge 128 is best shown in detail in FIGS. 4, 5a, 7, 8a-8f, 9a-9f, 10a-10c, 11a-11c, 12a-12c, and 13b-13c. In exemplary embodiments, the mounting wedge 128 is operable to be attached to the mounting plate 126. In the illustrated embodiment, the mounting wedge 128 includes a fastener opening 142 (such as a threaded opening). The fastener opening 142 in the mounting wedge 128 is operable to receive the mounting fastener 130.

An exemplary embodiment of the connecting plate 132 is best shown in detail in FIGS. 4, 5a, 7, 8a-8f, 9a-9f, 10a-10c, 11a-11c, 12a-12c, and 13b-13c. In exemplary embodiments, the connecting plate 132 is operable to be attached to the housing 28. In an exemplary embodiment, the connecting plate 132 includes at least one clamp 144. In the illustrated embodiment, the connecting plate 132 includes four clamps 144. In the illustrated embodiment, the connecting plate 132 includes an opening 146. In exemplary embodiments, the connecting plate 132 includes a geometric portion 148. In the illustrated embodiment, the geometric portion 148 of the connecting plate 132 is a spherical portion and, more specifically, a female spherical portion. In exemplary embodiments, the mounting wedge 128 is operable to be attached to the connecting plate 132.

An exemplary embodiment of the tube assembly 134 is best shown in detail in FIGS. 4, 5a, 10b-10c, 11b-11c, 12b-12c, 13b-13c, and 14a-14e. In exemplary embodiments, the tube assembly 134 is operable to provide fluid communication between the adapter 20 and the mixing assembly 22. In the illustrated embodiment, the tube assembly 134 includes a hot water tube 150, a cold water tube 152, and a mixed water tube 154. In the illustrated embodiment, the hot water tube 150, the cold water tube 152, and the mixed water tube 154 of the tube assembly 134 are operable to be received in the hot water inlet bore 48, the cold water inlet bore 50, and the mixed water outlet bore 52 of the adapter 20, respectively, at varying depths. In the illustrated embodiment, the tube assembly 134 includes a front end 156 and a rear end 158. In an exemplary embodiment, the front end 156 of the tube assembly 134 includes a geometric portion 160. In the illustrated embodiment, the geometric portion 160 of the tube assembly 134 is a spherical portion and, more specifically, a male spherical portion.

In exemplary embodiments, as best shown in FIGS. 10a-10c, 11a-11c, and 13a-13c, the mounting assembly 30 is operable to provide depth adjustability between the mixing assembly 22 in the housing 28 relative to the adapter 20 in the valve body 14. In the illustrated embodiment, the adapter 20 and the tube assembly 134 are operable to provide the depth adjustability between the mixing assembly 22 in the housing 28 relative to the adapter 20 in the valve body 14.

Figure 12A:
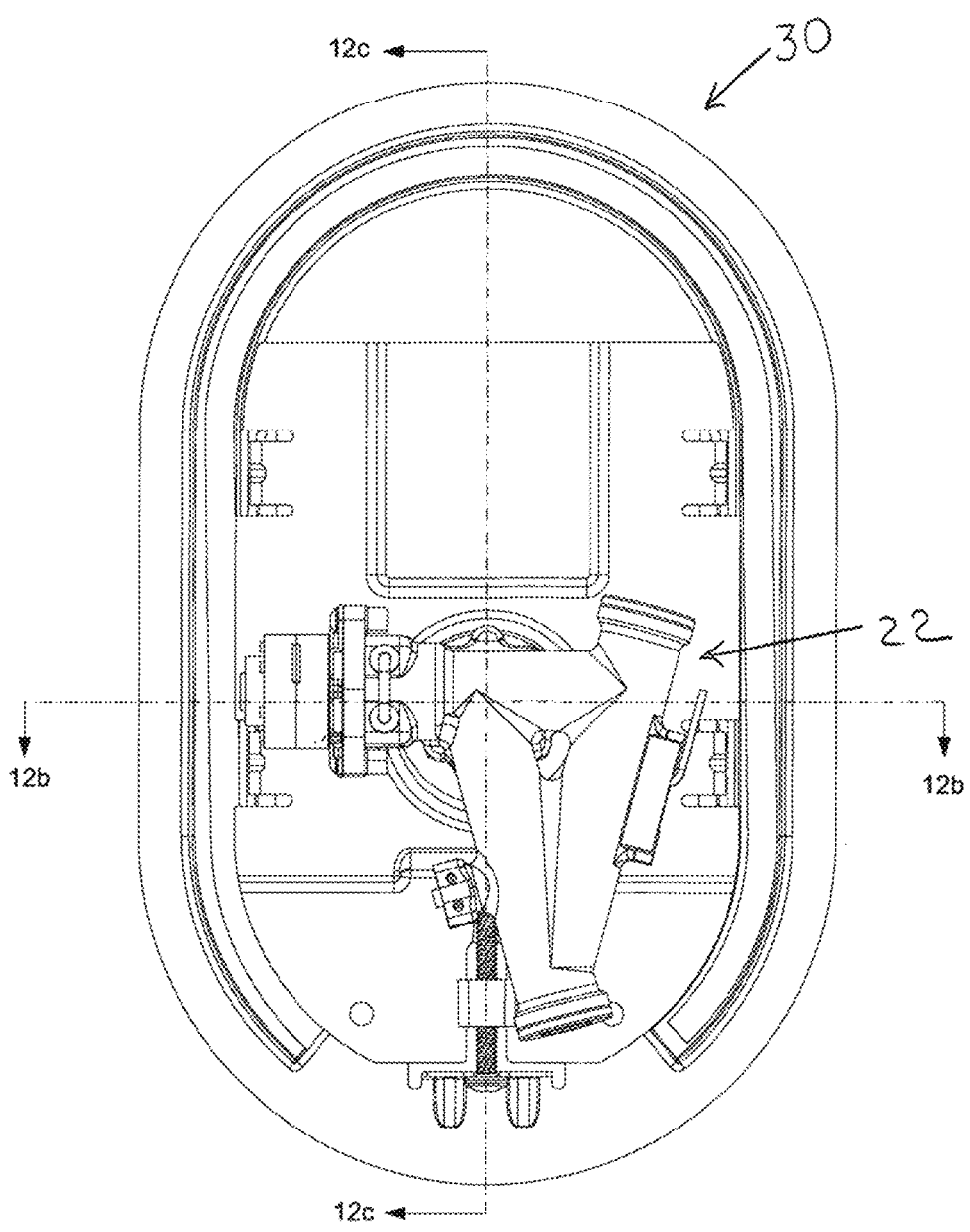
FIGS. 12a-12c are installed views of the valve body, the mounting assembly, and the mixing assembly of FIGS. 2a-2g in a far/angled wall configuration
Figure 12B:
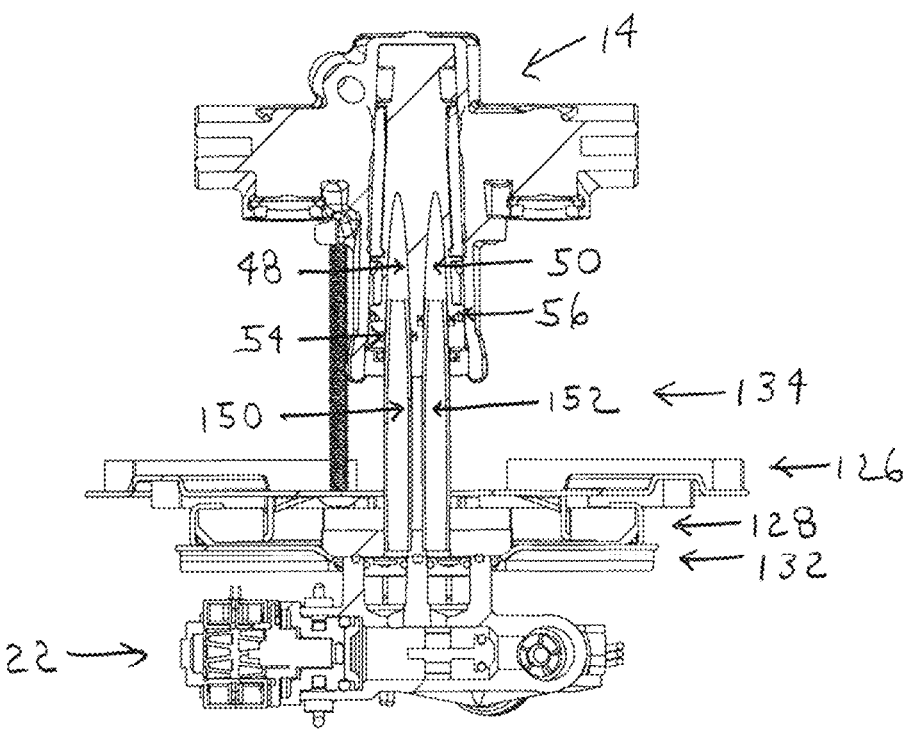
Figure 12C:
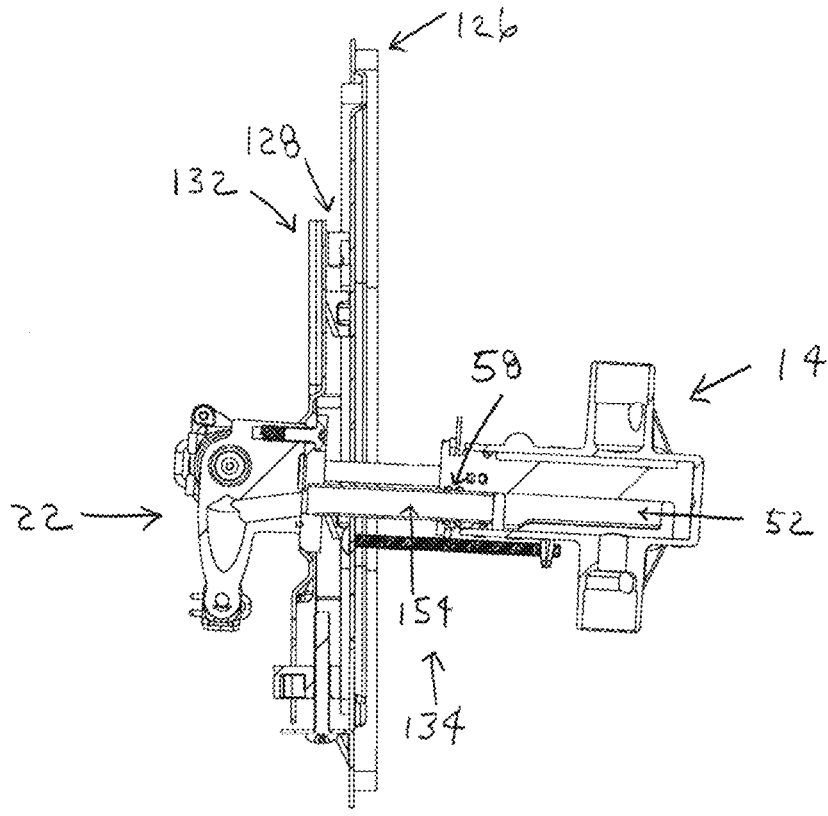
Figure 13A:
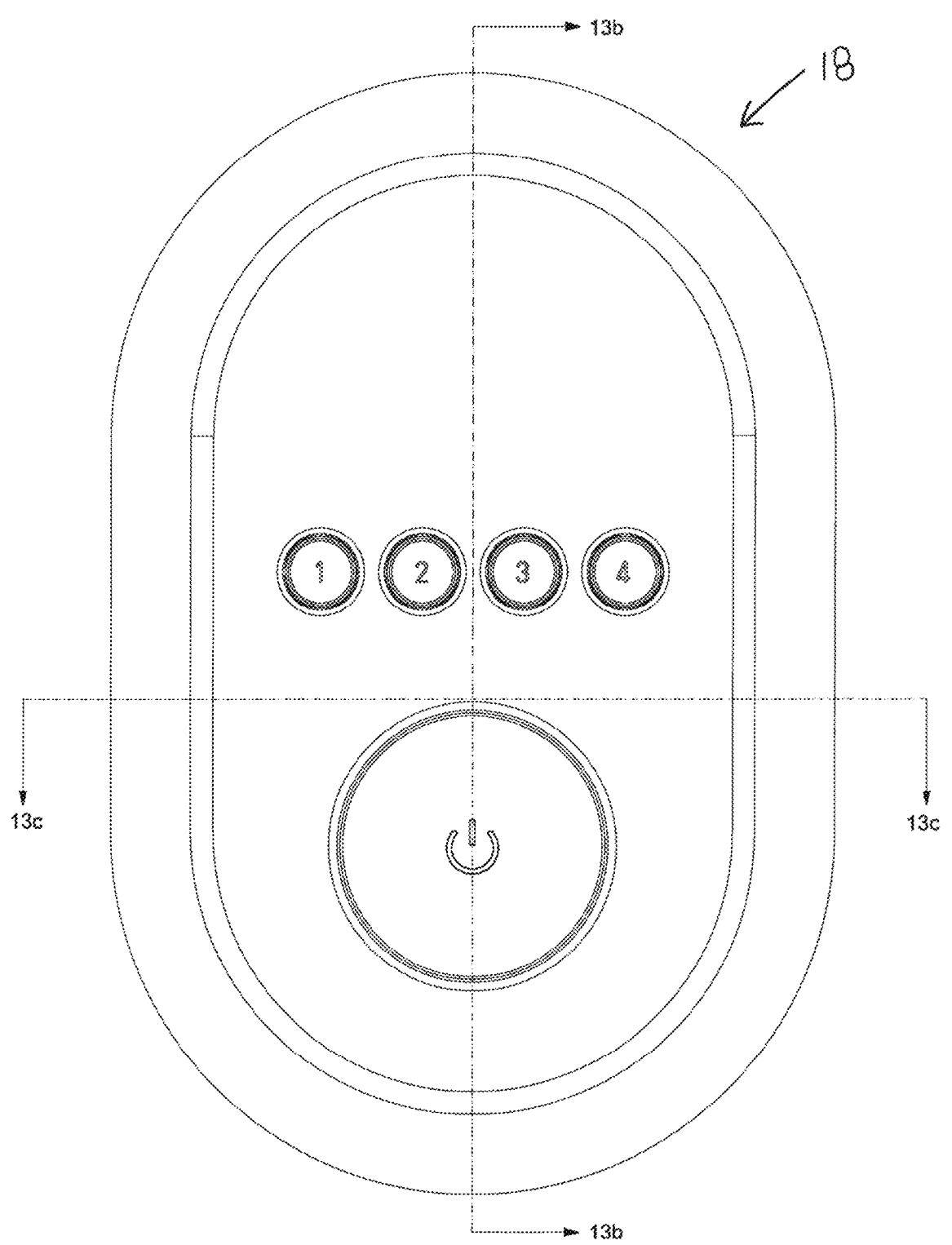
FIGS. 13a-13c are installed views of the valve body and the retrofit assembly of the plumbing system of FIGS. 2a-2g in a far/flat wall configuration
Figure 13B:
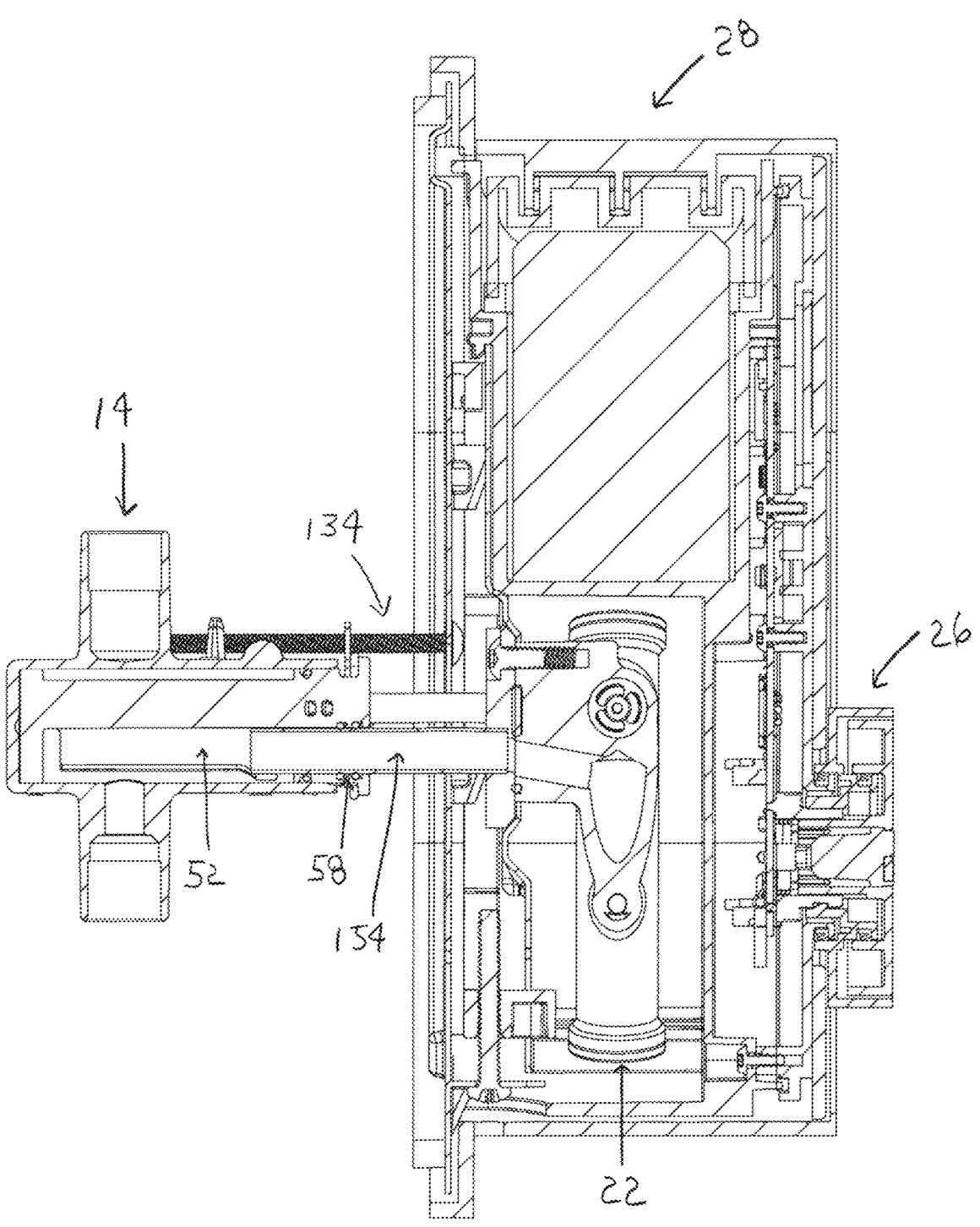
Figure 13C:
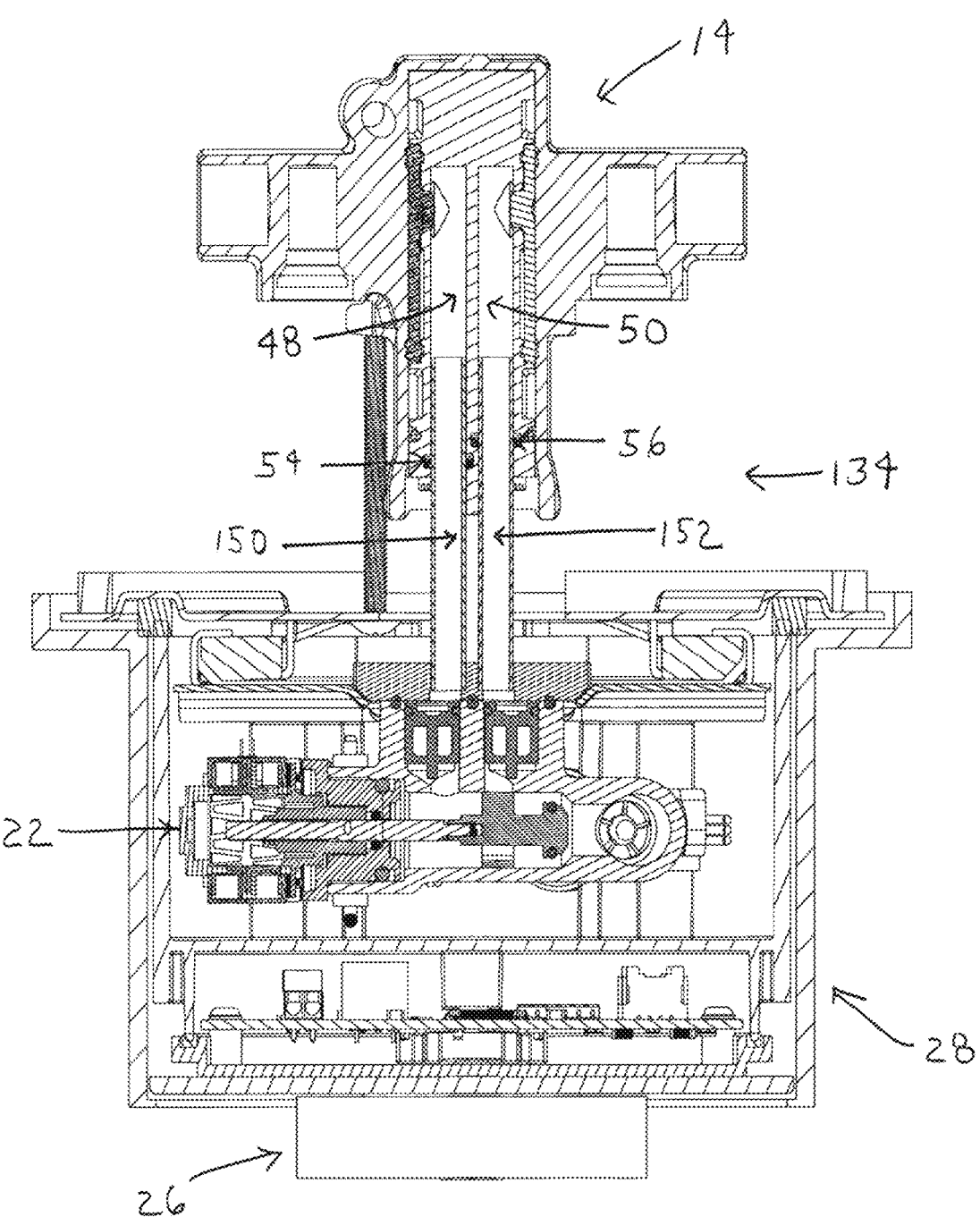

In exemplary embodiments, as best shown in FIGS. 12a-12c, the mounting assembly 30 is operable to provide angular adjustability between the mixing assembly 22 in the housing 28 relative to the adapter 20 in the valve body 14. In the illustrated embodiment, the connecting plate 132 and the tube assembly 134 are operable to provide the angular adjustability between the mixing assembly 22 in the housing 28 relative to the adapter 20 in the valve body 14.

In exemplary embodiments, the mounting assembly 30 is operable to provide at least one of depth adjustability and angular adjustability between the mixing assembly 22 in the housing 28 relative to the adapter 20 in the valve body 14.

In exemplary embodiments, the mounting assembly 30 is operable to provide depth adjustability and angular adjustability between the mixing assembly 22 in the housing 28 relative to the adapter 20 in the valve body 14.

The assembly and installation of the components of the plumbing system 10 will now be described.

In a standard mechanical plumbing system, the valve body 14 is connected to supply pipes (such as the hot water supply pipe HP and the cold water supply pipe CP) and to outlet pipes (such as the first mixed water outlet pipe MP1 and the second mixed water outlet pipe MP2) behind the mounting surface. The first mixed water outlet pipe MP1 is in fluid communication with the first plumbing device PD1 (such as the showerhead 12), and the second mixed water outlet pipe MP2 is in fluid communication with the second plumbing device PD2 (such as the tub spout 16). A mechanical cartridge is received in the bore 36 of the valve body 14, and a mechanical handle (and any associated trim) is attached to the cartridge. In the standard mechanical plumbing system, the mechanical handle is manually moved to control the temperature and/or the volume of water flowing through the plumbing system.

In exemplary embodiments, the standard mechanical plumbing system is retrofit to become an electronic plumbing system. This retrofit occurs without changing any of the components of the plumbing system mounted behind the mounting surface (such as the valve body 14, the supply pipes HP/CP, and the outlet pipes MP1/MP2). The electronic plumbing system is operable to be installed even when the valve body 14 is not ideally mounted behind the mounting surface (for example, when the valve body 14 is not at an ideal depth behind the mounting surface or is angled relative to the mounting surface). Additionally, the electronic plumbing system is operable to be installed even when the mounting surface has different properties (for example, when the mounting surface has a varying thickness). Further, the electronic plumbing system is operable to be installed without using any tools or requiring any measurements or adjustments by an installer.

In the illustrated embodiment, the mechanical handle (and any associated trim) is removed from the mounting surface. The mechanical cartridge is removed from the bore 36 of the valve body 14 behind the mounting surface. The adapter 20 is inserted into the bore 36 of the valve body 14 and secured in the bore 36 using a fastener 162 (such as a clip). The tabs 64 on the front end 60 of the adapter 20 are received in the notches 46 on the front side 42 of the valve body 14 to prevent rotation of the adapter 20 in the bore 36 of the valve body 14. The mounting plate 126 is placed on a front side of the mounting surface with the opening 138 in the mounting plate 126 aligned with the front end 60 of the adapter 20 and the bore 36 of the valve body 14. The mounting plate 126 is attached to the valve body 14 using a fastener 164 (such as screws) that extend through the mounting plate 126 into the valve body 14.

In the illustrated embodiment, the mounting wedge 128 is attached to the connecting plate 132 using the clamps 144 of the connecting plate 132. More specifically, a front side of the mounting wedge 128 is moved along a rear side of the connecting plate 132 until portions of the mounting wedge 128 are received in the clamps 144 of the connecting plate 132. The tube assembly 134 is placed on a rear side of the connecting plate 132 with the geometric portion 160 (such as the male spherical portion) of the tube assembly 134 received in the geometric portion 148 (such as the female spherical portion) of the connecting plate 132, and the mixing assembly 22 is placed on a front side of the connecting plate 132 with the hot water inlet 78 and the cold water inlet 80 of the mixing chamber 74 and the mixed water outlet 88 of the mixed water flow path 76 aligned with the hot water tube 150, the cold water tube 152, and the mixed water tube 154 of the tube assembly 134, respectively. With these components in place, the tube assembly 134, the connecting plate 132 (with the mounting wedge 128 attached to the connecting plate 132), and the mixing assembly 22 are attached to each other using a fastener 166 (such as screws) extending through the tube assembly 134 into the mixing assembly 22. The tube assembly 134, the mounting wedge 128, the connecting plate 132, and the mixing assembly 22 are attached to the housing 28 using a fastener 168 (such as screws) extending through the connecting plate 132 into the housing 28.

In the illustrated embodiment, the housing 28 (with the tube assembly 134, the mounting wedge 128, the connecting plate 132, and the mixing assembly 22 attached to it) is attached to the mounting plate 126. More specifically, the housing 28 is moved toward the mounting plate 126 with the hot water tube 150, the cold water tube 152, and the mixed water tube 154 of the tube assembly 134 aligned with the hot water inlet bore 48, the cold water inlet bore 50, and the mixed water outlet bore 52 of the adapter 20, respectively. The housing 28 is moved toward the mounting plate 126 until the housing 28 abuts the mounting plate 126. In this position, the hot water tube 150, the cold water tube 152, and the mixed water tube 154 of the tube assembly 134 are received in the hot water inlet bore 48, the cold water inlet bore 50, and the mixed water outlet bore 52 of the adapter 20, respectively. Additionally, in this position, the mounting fastener 130 is received in the fastener tab 140 of the mounting plate 126. This unengaged state is best shown in FIGS. 8a-8f. The mounting fastener 130 is rotated causing the mounting wedge 128 to move downwardly relative to the connecting plate 132 and the housing 28 until portions of the mounting wedge 128 are received in the clamps 136 of the mounting plate 126. This engaged state is best shown in FIGS. 9a-9f. The retrofit assembly 18 is now securely mounted. In the retrofit electronic plumbing system, the control buttons 114 and the control knob 124 are used to control the temperature and/or the volume of water flowing through the plumbing system.

As stated above, in exemplary embodiments, as best shown in FIGS. 10a-10c, 11a-11c, and 13a-13c, the mounting assembly 30 is operable to provide depth adjustability between the mixing assembly 22 in the housing 28 relative to the adapter 20 in the valve body 14. In the illustrated embodiment, the adapter 20 and the tube assembly 134 are operable to provide the depth adjustability between the mixing assembly 22 in the housing 28 relative to the adapter 20 in the valve body 14. Generally, a telescoping interface between the adapter 20 and the tube assembly 134 provides the depth adjustability between the mixing assembly 22 in the housing 28 relative to the adapter 20 in the valve body 14.

A length of the hot water tube 150, the cold water tube 152, and the mixed water tube 154 of the mixing assembly 22 enables them to be received in the hot water inlet bore 48, the cold water inlet bore 50, and the mixed water outlet bore 52 of the adapter 20, respectively, at varying depths. In an installation with a thinner mounting surface, the hot water tube 150, the cold water tube 152, and the mixed water tube 154 of the tube assembly 134 are more fully received in the hot water inlet bore 48, the cold water inlet bore 50, and the mixed water outlet bore 52 of the adapter 20, respectively. In an installation with a thicker mounting surface, the hot water tube 150, the cold water tube 152, and the mixed water tube 154 of the tube assembly 134 are less fully received in the hot water inlet bore 48, the cold water inlet bore 50, and the mixed water outlet bore 52 of the adapter 20, respectively.

A location of the hot water inlet bore seal 54, the cold water inlet bore seal 56, and the mixed water outlet bore seal 58 of the adapter 20 enables the hot water tube 150, the cold water tube 152, and the mixed water tube 154 of the tube assembly 134 to be securely received in the hot water inlet bore 48, the cold water inlet bore 50, and the mixed water outlet bore 52 of the adapter 20, respectively, at varying depths. More specifically, the hot water inlet bore seal 54, the cold water inlet bore seal 56, and the mixed water outlet bore seal 58 are located at or near the front end 60 of the adapter 20 (and, thus, at or near front ends of the hot water inlet bore 48, the cold water inlet bore 50, and the mixed water outlet bore 52, respectively). As a result, regardless of the thickness of the mounting surface, the hot water tube 150, the cold water tube 152, and the mixed water tube 154 of the tube assembly 134 are securely received in the hot water inlet bore 48, the cold water inlet bore 50, and the mixed water outlet bore 52 of the adapter 20, respectively.

A location of the hot water inlet bore seal 54, the cold water inlet bore seal 56, and the mixed water outlet bore seal 58 of the adapter 20 also enables the hot water tube 150, the cold water tube 152, and the mixed water tube 154 of the tube assembly 134 to be more easily inserted into the hot water inlet bore 48, the cold water inlet bore 50, and the mixed water outlet bore 52 of the adapter 20, respectively. More specifically, the hot water inlet bore seal 54, the cold water inlet bore seal 56, and the mixed water outlet bore seal 58 are at staggered locations relative to the front end 60 of the adapter 20 (and, thus, to the front ends of the hot water inlet bore 48, the cold water inlet bore 50, and the mixed water outlet bore 52, respectively). As a result, the force required to insert the hot water tube 150, the cold water tube 152, and the mixed water tube 154 of the tube assembly 134 into the hot water inlet bore 48, the cold water inlet bore 50, and the mixed water outlet bore 52 of the adapter 20, respectively, is reduced because the hot water inlet bore seal 54, the cold water inlet bore seal 56, and the mixed water outlet bore seal 58 are engaging at staggered times corresponding to the staggered locations.

As stated above, in exemplary embodiments, as best shown in FIGS. 12a-12c, the mounting assembly 30 is operable to provide angular adjustability between the mixing assembly 22 in the housing 28 relative to the adapter 20 in the valve body 14. In the illustrated embodiment, the connecting plate 132 and the tube assembly 134 are operable to provide the angular adjustability between the mixing assembly 22 in the housing 28 relative to the adapter 20 in the valve body 14. Generally, a geometric interface between the connecting plate 132 and the tube assembly 134 provides the angular adjustability between the mixing assembly 22 in the housing 28 relative to the adapter 20 in the valve body 14. More specifically, the geometric interface between the geometric portion 148 (such as the female spherical portion) of the connecting plate 132 and the geometric portion 160 (such as the male spherical portion) of the tube assembly 134 provides the angular adjustability between the mixing assembly 22 in the housing 28 relative to the adapter 20 in the valve body 14. While the interface between the connecting plate 132 and the tube assembly 134 has been shown and described in the illustrated embodiment as a spherical interface, one of ordinary skill in the art will appreciate that the interface could include any geometry that enables the angular adjustability between the mixing assembly 22 in the housing 28 relative to the adapter 20 in the valve body 14.

As described above, the tube assembly 134 is attached to the mixing assembly 22. Additionally, the geometric portion 160 (such as the male spherical portion) of the tube assembly 134 is received in the geometric portion 148 (such as the female spherical portion) of the connecting plate 132. In an installation where the front side 42 of the valve body 14 is generally parallel with the mounting surface, as best shown in FIGS. 10*a*-10*c*, 11*a*-11*c*, and 13*a*-13*c*, the geometric portion 160 (such as the male spherical portion) of the tube assembly 134 is generally centered in the geometric portion 148 (such as the female spherical portion) of the connecting plate 132 and the tube assembly 134 extends generally perpendicular to the mounting surface, while the connecting plate 132 is generally parallel to the mounting surface. In an installation where the front side 42 of the valve body 14 is not generally parallel with the mounting surface, as best shown in FIGS. 12*a*-12*c*, the geometric portion 160 (such as the male spherical portion) of the tube assembly 134 is operable to move within the geometric portion 148 (such as the female spherical portion) of the connecting plate 132 and the tube assembly 134 does not extend generally perpendicular to the mounting surface (it is angled from perpendicular and, thus, not properly aligned), while the connecting plate 132 is still generally parallel to the mounting surface. As a result, the tube assembly 134 (and, thus, the mixing assembly 22 attached to the tube assembly 134) is aligned with the adapter 20 (and, thus, the valve body 14 in which the adapter 20 is received) even when the valve body 14 is not properly aligned behind the mounting surface.

The flow of fluid (such as water) through the components of the plumbing system 10 will now be described.

In the illustrated embodiment, fluid (such as water) flows through the components of the plumbing system 10 as follows:

1. The hot water supply pipe HP and the cold water supply pipe CP;
2. The hot water inlet 32 and the cold water inlet 34 of the valve body 14;
3. The hot water inlet bore 48 and the cold water inlet bore 50 of the adapter 20;
4. The hot water tube 150 and the cold water tube 152 of the tube assembly 134;
5. The hot water inlet 78 and the cold water inlet 80 of the mixing chamber 74;
6. The hot water opening 86 and the cold water opening 88 in the mixing sleeve 82;
7. The mixing cavity 82 of the mixing chamber 74;
8. The mixed water flow path 76 of the waterway 66;
9. The mixed water outlet 88 of the mixed water flow path 76;
10. The mixed water tube 154 of the tube assembly 134;
11. The mixed water outlet bore 52 of the adapter 20;
12. The first mixed water outlet 38 and/or the second mixed water outlet 40 of the valve body 14;
13. The first mixed water outlet pipe MP1 and/or the second mixed water outlet pipe MP2; and
14. The first plumbing device PD1 and/or the second plumbing device PD2.

While the plumbing system 10 has been shown and described in the illustrated embodiment as including certain components, one of ordinary skill in the art will appreciate that the plumbing system 10 does not need to include each of these components.

As an example, in the illustrated embodiment, the mounting assembly 30 includes the separate connecting plate 132. However, one of ordinary skill in the art will appreciate that the connecting plate 132 could be formed as a part of the housing 28.

While the plumbing system 10 has been shown and described in the illustrated embodiment as including components having certain features, one of ordinary skill in the art will appreciate that the plumbing system 10 could have these features on other components.

While the plumbing system 10 has been shown and described in the illustrated embodiment as including components having certain shapes, sizes, numbers, and configurations and made of certain materials, one of ordinary skill in the art will appreciate that the components of the plumbing system 10 do not need to have these shapes, sizes, numbers, and configurations and be made of these materials.

While the plumbing system 10 has been shown and described in the illustrated embodiment with the components of the plumbing system 10 attached and used in a particular manner, one of ordinary skill in the art will appreciate that the components of the plumbing system 10 do not need to be attached and used in this manner.

Exemplary embodiments of the plumbing system 10 enable a mechanical system to be retrofit into an electronic system. These exemplary embodiments provide, among others, the following features, either alone or in combination:

1. The mounting of the mixing assembly 22 in front of the mounting surface;
2. The depth adjustability between the mixing assembly 22 in front of the mounting surface relative to the valve body 14 behind the mounting surface;
3. The depth adjustability provided by the telescoping interface;
4. The angular adjustability between the mixing assembly 22 in front of the mounting surface relative to the valve body 14 behind the mounting surface;
5. The angular adjustability provided by the geometric interface, such as the spherical interface;
6. The electronic mixing of water in front of the mounting surface;
7. The electronic mixing assembly 22 mounted in front of the mounting surface;
8. The mixing assembly 22 including the waterway 66 and the electronic valve 68 mounted in front of the mounting surface;
9. Temperature control (i.e., mixing) and flow control (i.e., shut off) controlled by the same component (e.g., the electronic valve 68 and, more specifically, the spool 94);
10. Temperature control (i.e., mixing) and flow control (i.e., shut off) occurring in the same component (e.g., the mixing chamber 74 and, more specifically, the mixing cavity 82);
11. The mixing assembly 22 including the temperature sensor 72 in the waterway 66; and
12. The electronic valve 68 including the single motor 92.

One of ordinary skill in the art will now appreciate that the present invention provides a plumbing system operable to retrofit a mechanical system into an electronic system and, more specifically, a plumbing system with a mounting assembly operable to mount an electronic mixing assembly in front of a mounting surface. Although the present invention has been shown and described with reference to particular embodiments, equivalent alterations and modifications will occur to those skilled in the art upon reading and understanding this specification. The present invention includes all such equivalent alterations and modifications and is limited only by the scope of the following claims in light of their full scope of equivalents.

What is claimed is:

1. A plumbing system, the plumbing system having a valve body, the plumbing system comprising:
an adapter, the adapter operable to be received in the valve body behind a mounting surface, the adapter further operable to receive hot water from a hot water inlet of the valve body and cold water from a cold water inlet of the valve body;
a mixing assembly, the mixing assembly operable to fluidly communicate with the adapter, the mixing assembly further operable to receive hot water and cold water from the adapter and provide mixed water to the adapter; and
a housing, the mixing assembly operable to be received in the housing in front of the mounting surface;
the mixing assembly including a waterway and an electronic valve;
the waterway operable to receive hot water and cold water from the adapter and provide mixed water to the adapter;
the electronic valve operable to control flow of hot water and cold water from the adapter to the waterway;
the waterway including a mixing chamber;
the mixing chamber including a hot water inlet and a cold water inlet;
the mixing chamber including a hot interface between the hot water inlet and the mixing chamber and a cold interface between the cold water inlet and the mixing chamber; and
wherein the electronic valve is not operable to seal against the hot interface between the hot water inlet and the mixing chamber or the cold interface between the cold water inlet and the mixing chamber and is not operable to prevent flow of water from the hot water inlet or the cold water inlet to the mixing chamber.

2. The plumbing system of claim 1, wherein:
the mixing assembly includes a temperature sensor; and
the temperature sensor is operable to detect a temperature of mixed water flowing through the waterway.

3. The plumbing system of claim 2, wherein:
the waterway includes a mixed water flow path; and
the temperature sensor is located at least one of downstream of the mixing chamber and in the mixed water flow path.

4. The plumbing system of claim 2, wherein:
the electronic valve is operable to control flow of hot water and cold water from the adapter to the waterway based on the detected temperature of mixed water flowing through the waterway.

5. The plumbing system of claim 1, wherein:
the waterway includes a mixed water flow path;
the mixing chamber is operable to fluidly communicate with the adapter, the mixing chamber is further operable to receive hot water and cold water from the adapter;
the mixed water flow path is operable to fluidly communicate with the mixing chamber, the mixed water flow path is further operable to receive mixed water from the mixing chamber; and
the mixed water flow path is operable to fluidly communicate with the adapter, the mixed water flow path is further operable to provide mixed water to the adapter.

6. The plumbing system of claim 1, wherein:
the waterway includes a mixed water flow path;

the waterway includes a mixed interface between the mixing chamber and the mixed water flow path; and
the electronic valve is operable to seal against the mixed interface between the mixing chamber and the mixed water flow path and to prevent flow of water from the mixing chamber to the mixed water flow path.

7. The plumbing system of claim 1, wherein:
the waterway includes a mixed water flow path;
the electronic valve is operable to control flow of water from the hot water inlet and the cold water inlet to the mixing chamber; and
the electronic valve is operable to prevent flow of water from the mixing chamber to the mixed water flow path.

8. The plumbing system of claim 1, wherein:
the electronic valve includes a single motor.

9. A plumbing system, the plumbing system having a valve body, the plumbing system comprising:
an adapter, the adapter operable to be received in the valve body behind a mounting surface, the adapter further operable to receive hot water from a hot water inlet of the valve body and cold water from a cold water inlet of the valve body;
a mixing assembly, the mixing assembly operable to fluidly communicate with the adapter, the mixing assembly further operable to receive hot water and cold water from the adapter and provide mixed water to the adapter; and
a housing, the mixing assembly operable to be received in the housing in front of the mounting surface;
the mixing assembly including a waterway and an electronic valve;
the waterway operable to receive hot water and cold water from the adapter and provide mixed water to the adapter;
the electronic valve operable to control flow of hot water and cold water from the adapter to the waterway;
the waterway including a mixing chamber;
the mixing chamber including a hot water inlet and a cold water inlet;
the mixing chamber including a hot interface between the hot water inlet and the mixing chamber and a cold interface between the cold water inlet and the mixing chamber; and
wherein the electronic valve is not operable to seal against the hot interface between the hot water inlet and the mixing chamber and is not operable to prevent flow of water from the hot water inlet to the mixing chamber.

10. The plumbing system of claim 9, wherein:
the mixing assembly includes a temperature sensor;
the temperature sensor is operable to detect a temperature of mixed water flowing through the waterway;
the waterway includes a mixed water flow path; and
the temperature sensor is located at least one of downstream of the mixing chamber and in the mixed water flow path.

11. The plumbing system of claim 10, wherein:
the electronic valve is operable to control flow of hot water and cold water from the adapter to the waterway based on the detected temperature of mixed water flowing through the waterway.

12. The plumbing system of claim 9, wherein:
the waterway includes a mixed water flow path;
the mixing chamber is operable to fluidly communicate with the adapter, the mixing chamber is further operable to receive hot water and cold water from the adapter;

the mixed water flow path is operable to fluidly communicate with the mixing chamber, the mixed water flow path is further operable to receive mixed water from the mixing chamber; and the mixed water flow path is operable to fluidly communicate with the adapter, the mixed water flow path is further operable to provide mixed water to the adapter.

13. The plumbing system of claim 9, wherein:

the waterway includes a mixed water flow path;

the waterway includes a mixed interface between the mixing chamber and the mixed water flow path; and the electronic valve is operable to seal against the mixed interface between the mixing chamber and the mixed water flow path and to prevent flow of water from the mixing chamber to the mixed water flow path.

14. The plumbing system of claim 9, wherein:

the waterway includes a mixed water flow path;

the electronic valve is operable to control flow of water from the hot water inlet and the cold water inlet to the mixing chamber; and the electronic valve is operable to prevent flow of water from the mixing chamber to the mixed water flow path.

15. A plumbing system, the plumbing system having a valve body, the plumbing system comprising:

an adapter, the adapter operable to be received in the valve body behind a mounting surface, the adapter further operable to receive hot water from a hot water inlet of the valve body and cold water from a cold water inlet of the valve body;

a mixing assembly, the mixing assembly operable to fluidly communicate with the adapter, the mixing assembly further operable to receive hot water and cold water from the adapter and provide mixed water to the adapter; and a housing, the mixing assembly operable to be received in the housing in front of the mounting surface;

the mixing assembly including a waterway and an electronic valve;

the waterway operable to receive hot water and cold water from the adapter and provide mixed water to the adapter;

the electronic valve operable to control flow of hot water and cold water from the adapter to the waterway;

the waterway including a mixing chamber;

the mixing chamber including a hot water inlet and a cold water inlet;

the mixing chamber including a hot interface between the hot water inlet and the mixing chamber and a cold interface between the cold water inlet and the mixing chamber; and wherein the electronic valve is not operable to seal against the cold interface between the cold water inlet and the mixing chamber and is not operable to prevent flow of water from the cold water inlet to the mixing chamber.

16. The plumbing system of claim 15, wherein:

the mixing assembly includes a temperature sensor;

the temperature sensor is operable to detect a temperature of mixed water flowing through the waterway;

the waterway includes a mixed water flow path; and the temperature sensor is located at least one of downstream of the mixing chamber and in the mixed water flow path.

17. The plumbing system of claim 16, wherein:

the electronic valve is operable to control flow of hot water and cold water from the adapter to the waterway based on the detected temperature of mixed water flowing through the waterway.

18. The plumbing system of claim 15, wherein:

the waterway includes a mixed water flow path;

the mixing chamber is operable to fluidly communicate with the adapter, the mixing chamber is further operable to receive hot water and cold water from the adapter;

the mixed water flow path is operable to fluidly communicate with the mixing chamber, the mixed water flow path is further operable to receive mixed water from the mixing chamber; and the mixed water flow path is operable to fluidly communicate with the adapter, the mixed water flow path is further operable to provide mixed water to the adapter.

19. The plumbing system of claim 15, wherein:

the waterway includes a mixed water flow path;

the waterway includes a mixed interface between the mixing chamber and the mixed water flow path; and the electronic valve is operable to seal against the mixed interface between the mixing chamber and the mixed water flow path and to prevent flow of water from the mixing chamber to the mixed water flow path.

20. The plumbing system of claim 15, wherein:

the waterway includes a mixed water flow path;

the electronic valve is operable to control flow of water from the hot water inlet and the cold water inlet to the mixing chamber; and the electronic valve is operable to prevent flow of water from the mixing chamber to the mixed water flow path.

* * * * *